United States Patent [19]

Akashi et al.

[11] Patent Number: 5,615,399
[45] Date of Patent: Mar. 25, 1997

[54] FOCUS DETECTING APPARATUS HAVING PHOTOELECTRIC AREA SENSORS

[75] Inventors: Akira Akashi, Yokohama; Mamoru Miyawaki, Tokyo; Kenji Suzuki, Kawasaki; Toshiki Nakayama, Atsugi, all of Japan

[73] Assignee: Canon Kabushiki Kaisha, Tokyo, Japan

[21] Appl. No.: 516,412

[22] Filed: Aug. 17, 1995

Related U.S. Application Data

[62] Division of Ser. No. 411,287, Mar. 27, 1995, which is a division of Ser. No. 936,010, Aug. 27, 1992, Pat. No. 5,428,420.

[30] Foreign Application Priority Data

Aug. 28, 1991 [JP] Japan ................................. 3-217075
Nov. 29, 1991 [JP] Japan ................................. 3-339367

[51] Int. Cl.⁶ .......................................... G03B 13/36
[52] U.S. Cl. ................................. 396/128; 348/247
[58] Field of Search ......................... 354/402; 348/246, 348/247

[56] References Cited

U.S. PATENT DOCUMENTS

| | | | |
|---|---|---|---|
| 4,237,488 | 12/1980 | Takemura | 348/246 |
| 4,573,784 | 3/1986 | Suzuki | 354/406 |
| 4,589,028 | 5/1986 | Ochi | 348/246 |
| 4,805,023 | 2/1989 | Younse et al. | 348/246 |
| 4,859,842 | 8/1989 | Suda et al. | 250/201 |
| 4,903,065 | 2/1990 | Taniguchi et al. | 354/402 |
| 4,954,701 | 9/1990 | Suzuki et al. | 250/201.8 |
| 4,980,716 | 12/1990 | Suzuki et al. | 354/403 |
| 5,095,368 | 3/1992 | Miyakawa et al. | 348/246 |
| 5,128,768 | 7/1992 | Suda et al. | 358/227 |
| 5,151,732 | 9/1992 | Akashi et al. | 354/402 |
| 5,155,347 | 10/1992 | Nishibe | 250/201.8 |
| 5,241,167 | 8/1993 | Suzuki et al. | 250/201.8 |

FOREIGN PATENT DOCUMENTS

| | | |
|---|---|---|
| 63-11906 | 1/1988 | Japan . |
| 63-172209 | 7/1988 | Japan . |
| 1-271716 | 10/1989 | Japan . |

Primary Examiner—W. B. Perkey
Attorney, Agent, or Firm—Fitzpatrick, Cella, Harper & Scinto

[57] ABSTRACT

This invention relates to a focus detecting apparatus using an area sensor as an AF sensor, and particularly provides a focus detecting apparatus in which when any area in a scene is designated and the focus state in that area is to be detected, the output from an area on the sensor corresponding to the designated area of the scene is read and processed on the basis of the information of an area on the area sensor corresponding to the designated area of the scene pre-memorized in a memory circuit.

9 Claims, 17 Drawing Sheets

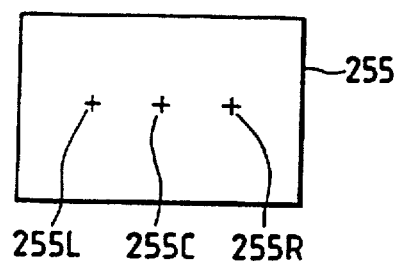
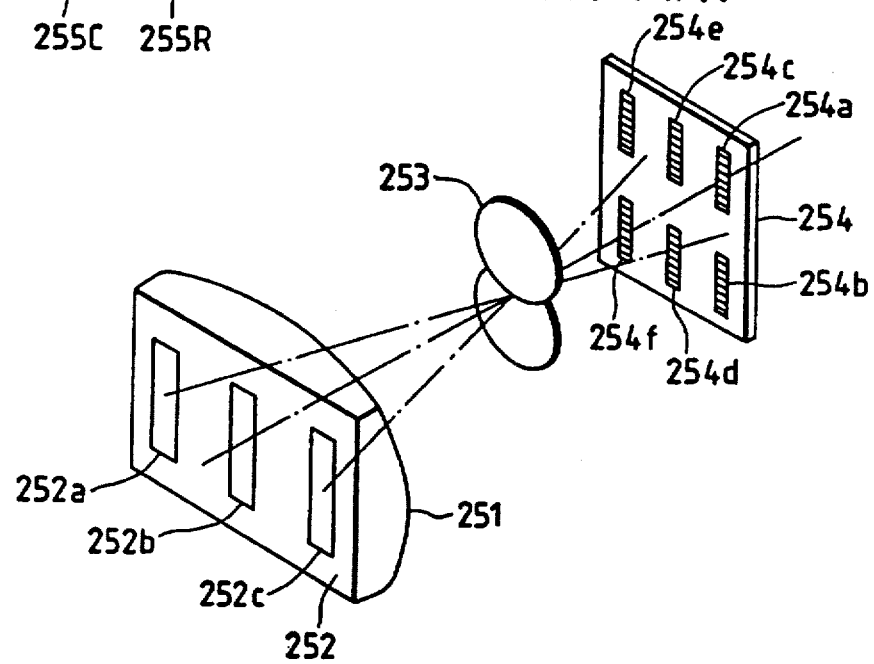
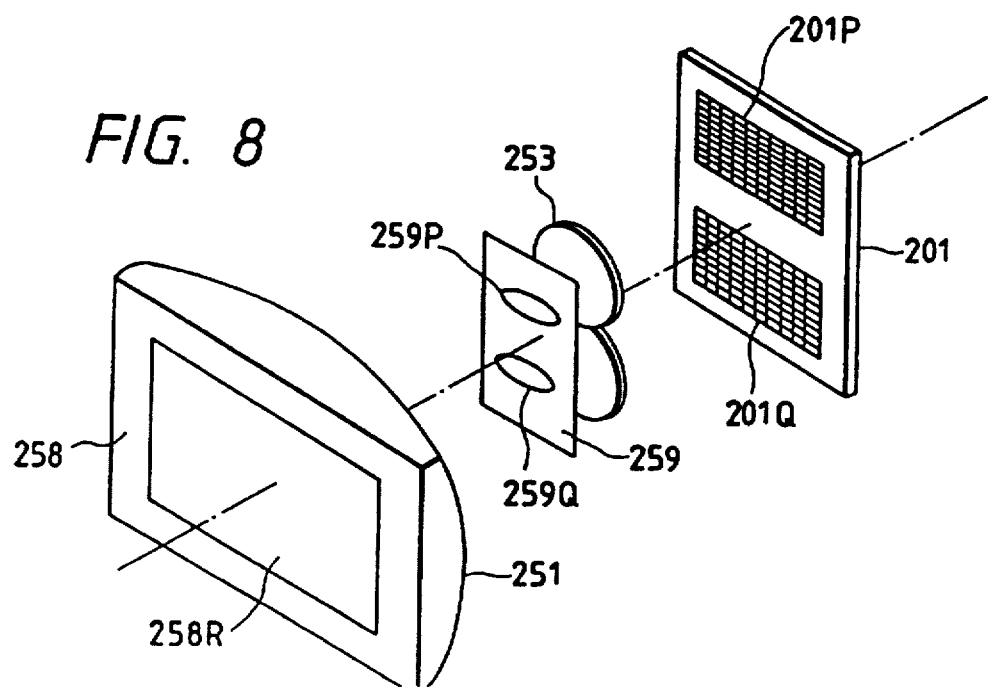

FOCUS DETECTING APPARATUS HAVING PHOTOELECTRIC AREA SENSORS

This application is a division of application Ser. No. 08/411,287, filed Mar. 27, 1995, which is a division of application Ser. No. 07/936,010 filed Aug. 27, 1992, now U.S. Pat. No. 5,428,420.

BACKGROUND OF THE INVENTION

1. Field of the Invention

This invention relates to an automatic focus detecting apparatus capable of accomplishing focus detection, for example, in any area of the image field of a photographing apparatus by the Use of an area sensor and to the semiconductive photoelectric area sensor device thereof.

2. Related Background Art

A number of apparatuses capable of accomplishing focus detection at a plurality of points in the photographing image field have heretofore been proposed as automatic focus detecting apparatuses in cameras.

A sensor which is a photoelectric converting element used in an automatic focus detecting apparatus comprises a finite number of sensor arrays corresponding to focus detection points which are disposed on the same substrate, and specific examples of the construction thereof are described in detail, for example, in Japanese Laid-Open Patent Application Nos. 63-11906, 63-172209 and 1-271716.

FIG. 7 of the accompanying drawings shows the construction of the optical system of an automatic focus detecting apparatus according to the prior art. As shown in FIG. 7A, the optical system of the automatic focus detecting apparatus is comprised of a field lens 251, a multiaperture field mask 252, a secondary imaging lens 253 comprising two juxtaposed positive lenses, and a sensor chip 254 comprising a plurality of pairs of sensor arrays arranged. The multiaperture field mask 252 is provided at a location near the predetermined imaging plane of a photo-taking lens, not shown, and openings 252a, 252b and 252c in the multiaperture field mask 252 determined focus detection areas in the photographing image field. The secondary imaging lens 253 re-images a part of an object image limited by the opening 252a on the pair of sensor arrays 254a and 254b. Likewise, object images limited by the openings 252b and 252c are re-imaged on the pairs of sensor arrays 254c, 254d and 254e, 254f, respectively. The object image signals of the respective pairs of sensor arrays are read out as electrical signals and focus detection calculation is executed in a processing device.

The focus state of the photo-taking lens for the object in the focus detection fields of view determined by the openings 252a, 252b and 252c is detected in this manner. When the focus detection fields of view determined by the three openings 252a, 252b and 252c are applied to the photographing image field, they correspond to the positions of the focus detection fields of view 255L, 255C and 255R of the photographing image field 255 shown, for example, in FIG. 7B.

Where there are several focus detection fields of view and the positions of those fields of view are fixed, it is usual to discretely dispose sensor arrays on the sensor chip 254 corresponding to the positions of the respective detection fields of view as in this example, and provide a sensor driving circuit in the area between the sensor arrays on the sensor chip 254.

Where the number of the positions of focus detection is several like this, it is possible to discretely provide linear sensor arrays on one chip corresponding to the respective focus detection positions, as in the above-described sensor device 254. In the area between the discretely disposed linear sensor arrays, there can be provided a logic circuit and an analog circuit supporting the function of the linear sensor arrays and therefore, there can be constructed a device which has a high degree of integration.

However, if an attempt is made to make the disposition of the focus detection positions denser, this method has a limit and is inappropriate. The reason is that the linear sensor arrays each require temporary memory means for image analog information (which is necessary to serially output photoelectric charge information the accumulation of which has been completed in unison), a serial information transfer system, a shift register for effecting clocking for successively reading out information, etc., in addition to sensor picture elements, and these additional circuits require a much greater area than the sensor picture elements and thus, the number of sensor arrays which can be constructed in one chip is severely limited.

So, to dispose focus detection positions more densely than in the prior art, it is desirable to use a so-called area sensor in which sensor cells are two-dimensionally regularly arranged. In this case, the picture element information of a portion of the light receiving area of the area sensor is selectively calculated, whereby the focus state at a particular object position can be detected. In a camera containing an electronic image pickup device therein, such as a TV camera or a camera integrally provided with VTR, the use of both a sensor for image pickup and a sensor for focus detection is possible and therefore, not multipoint detection but focus detection using an area sensor has been put into practical use.

FIG. 22 of the accompanying drawings shows an example of it. A focus lens 107 is designed to be capable of being driven by a focus motor 108, and a solid state image pickup element 110 is attached to the center of a bimorph 109. The solid state image pickup element 110 is for photoelectrically converting optical image information formed by the focus lens 107, and usually has 100,000 to 500,000 picture elements and is directed by a video signal processing system, not shown, to output an image signal. The bimorph 109 is driven by an AC voltage from a bimorph driving circuit 111 and vibrates the solid state image pickup element 110 in the direction of the optic axis. The output signal of the solid state image pickup element 110 is connected to a blur detection circuit 112, which detects a front focus state (a state in which the lens is in focus to the front) or a rear focus state (a state in which the lens is in focus to the rear) by the vibration, rotates the focus motor 108 in a direction in which blur decreases, and drives the focus lens 107.

Generally, a main object which is the object of photographing and the background thereof coexist at a time in the entire image field of a picked-up image and therefore, in the blur detection circuit 112, the range of the image field which is the object of calculation detection must be restricted in some form, and in the prior art, such range is usually restricted to the central portion of the image field to thereby limit the control object range in advance. Alternatively, use is often made of a technique whereby a frame of a predetermined size is provided around the center of the image field and control is effected on a location which is highest in contrast within that range.

In the case of a focus detecting apparatus using a photoelectric area sensor in which picture elements are two-dimensionally arranged, the prior art has suffered from many problems as will hereinafter be described, and a satisfactory technique of arranging a number of focus detection points, and comparatively evaluating and controlling them has not yet been completely put into practical use.

A first problem is that the popular photoelectric area sensor for image pickup does not adopt a method of accessing to localized information at random. Generally in multipoint focus detection, it is necessary to data-calculate the image information of each detection point quickly and reflect the result of comparison and evaluation in focus adjustment control, and since this calculation process is executed by hardware using a microprocessor as a base or a digital circuit such as DSP, it is necessary to analog/digital (A/D) convert the image information and accumulate it in a digital memory. If the information of each focus detection point can be random-accessed, such data sampling will become remarkably easy in all points such as the hardware construction of the system, the capacity of the memory and the required speed of the A/D converter. In the prior-art area sensor, the function of the designated block for focus detection at random has not been sufficient and therefore, the construction of a satisfactory focus detecting function has been difficult. Particularly, a focus detecting apparatus of the phase difference type requires the photoelectric outputs of two corresponding optical images to be passed through different optical paths, and requires a sensor device for appropriately controlling and outputting two corresponding blocks separated from each other at synchronized timing. In an ordinary area sensor, necessary data must be taken out while the entire image field is read out at a uniformly high clock speed, and the timing of reading-out is limited in terms of hardware. This gives rise to a problem that in spite of a high-speed device being used, much time is required before the result of focus detection is obtained, and the ability of the system cannot be enhanced. Also, in some cases, it is desired to change the position of focus detection depending on the focal length of the photo-taking lens or the kind of the object, and it is an important factor that the focus detection point can be designated at random.

A second problem is that in an ordinary scene wherein the brightness or contrast of each focus detection point differs, optimal signal accumulation cannot be accomplished for each focus detection point. A person or a scene which becomes the object of image pickup in a photograph or video has a wide range of quantity of light and a main object is not always brightest. Cases where the scene which is the background is 10 to 100 times higher in brightness than the face of a person to be photographed occur frequently. Also, there is a point at which there is the regular reflection of the sun in the background and which is 1,000 times brighter than the main object. Accordingly, where an area sensor is applied to a system having a number of focus detection points, it is necessary that optimal accumulation control and the designation of amplification gain during reading-out can be accomplished for each focus detection point. An ordinary silicon photoelectric element used at normal temperature has a dynamic range of the order of only 100–1,000 and therefore, it is hardly be expected to secure sufficient S/N of each detection point by uniform control of the entire image field for a wide range of brightness fluctuation which becomes the object of photographing. The use of a prior-art area sensor results in optimal control being done for a location which is high in brightness, and this leads to the construction of such a system in which, independently of the photographer's intention, focusing is effected preferentially on an object of high brightness or an object of high contrast.

Further, if the disposition of focus detection points is made dense, the size of the picture elements of the photoelectric sensor becomes small and therefore, the quantity of light distributed to each focus detection point decreases and the performance of the low brightness side becomes bad. Accordingly, if the prior-art area sensor is used in a multipoint focus detection system, the deterioration of the low brightness limit performance and the determination of the auxiliary light effective distance during the projection of auxiliary light will be unavoidable.

A third problem is that an area sensor chip has a greater number of photoelectric conversion elements arranged on the surface thereof than in a line sensor and unsatisfactory picture elements are liable to occur correspondingly to the greater absolute number of picture elements. If no unsatisfactory picture element is allowed in using an area sensor, the yield will become very bad and this in turn will lead to an increase in the cost of the product and therefore, it is not realistic, and the area sensor must be used with a certain degree of dissatisfaction with the picture elements being allowed. However, if any unsatisfactory picture element exists Just in the area wherein the focus detecting process is carried out, an error will as a matter of course mix with the result of the process for that area and an accurate focus detecting operation cannot be ensured.

SUMMARY OF THE INVENTION

One aspect of the application is the provision of an automatic focus detecting apparatus which is capable of accomplishing accurate focus detection without being affected by the aberrations of an optical system even if the focus detection area is the marginal portion of the image field and which can simplify the step of adjusting parallax.

One aspect of the application is the provision of a semiconductive photoelectric area sensor device which, by being used in an automatic focus detecting apparatus, can designate focus detection points at random by an easy hardware construction and low power consumption and is capable of accomplishing optimal signal accumulation for each of the designated focus detection points, and can provide a sufficient focus detecting performance for a wide range of brightness fluctuation in the object image field, thus enhancing the system ability of the automatic focus detecting apparatus.

One aspect of the application is the provision of an automatic focus detecting apparatus which is provided with an area sensor in which photoelectric conversion elements for converting incident light into an image signal are two-dimensionally disposed an optical system for imaging the incident light on said area sensor, memory means for memorizing the correction information of a predetermined area on said area sensor which is based on the characteristic of said optical system, and processing means for processing the image signal of the predetermined area on said area sensor determined on the basis of said correction information and which pre-memorizes correction information based on the characteristic of a focus detecting optical system, i.e., optical aberration information, or parallax information and which, when an area to be focus-detected on the image field is determined, determines the position and shape (range) of the selected area on the area sensor from the aberration information and parallax information of the optical system for the position of said area, effects the selection of an image signal read out by the area sensor and effects focus detection calculation on the basis of said image signal.

One aspect of the application is the provision of a photoelectric conversion device or a focus detecting apparatus which is provided with settling means for setting a plurality of focus detecting picture element blocks of any size at a time at any location on a photoelectric area sensor in which photoelectric conversion elements are two-dimensionally arranged, addition means for adding picture element signals in a direction orthogonal to an array direction in which serial reading-out is effected, and discrimination means for discriminating, independently for each of said detecting picture element blocks, whether the signal addition should be executed, from the magnitude of the amount of accumulated charges in each of said plurality of detecting picture element blocks, and which designates positions to be focus-detected as detecting picture element blocks prior to the start of the driving of the photoelectric area sensor, and thereafter drives the photoelectric area sensor to effect photoelectric charge accumulation in each of said designated detecting picture element blocks, discriminates whether the signal addition should be executed, from the magnitude of the amount of accumulated charges, effects the signal addition in the detecting picture element block which has been discriminated as the execution of the signal addition, and thereafter reads out a signal and effects a calculating process.

One aspect of the application is the provision of a photoelectric conversion device or a focus detecting apparatus which, when an unsatisfactory picture element exists in a portion of an area sensor, can use the signal of a normal picture element near the unsatisfactory picture element, instead of the signal of said unsatisfactory picture element, thereby taking out a picture element signal of high accuracy without reducing the yield of the area sensor.

Other objects of the present invention will become apparent from the following detailed description of some embodiments of the invention taken in conjunction with the accompanying drawings.

BRIEF DESCRIPTION OF THE DRAWINGS

FIGS. 8A and 8B show the photographing image field and areas on the area sensor of FIG. 1 corresponding thereto.

FIGS. 7A and 7B show the construction of the optical system of an automatic focus detecting apparatus according to the prior art.

FIG. 8 shows the construction of the optical system of an automatic focus detecting apparatus using an area sensor.

DESCRIPTION OF THE PREFERRED EMBODIMENTS

Figure 1:
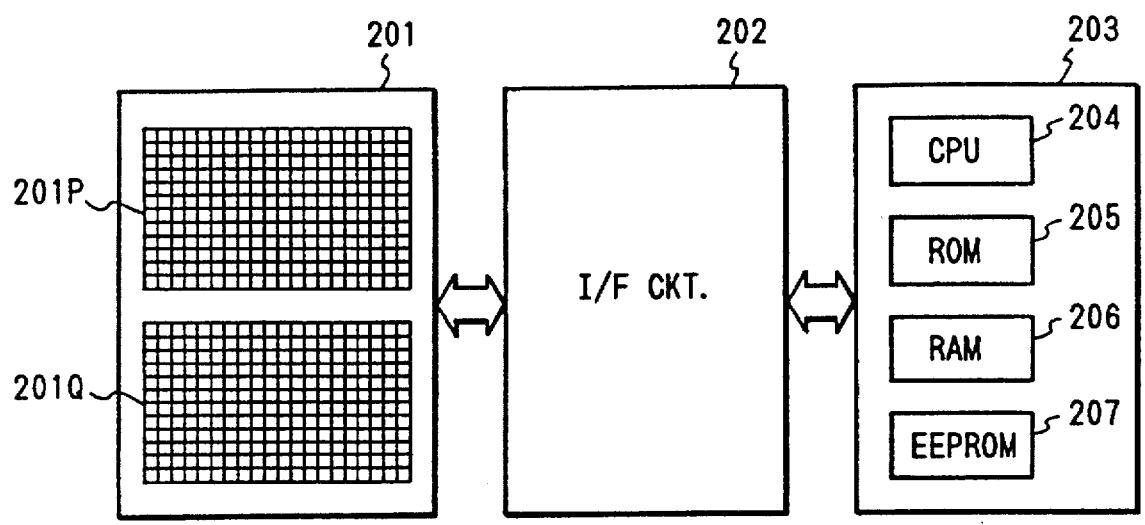
FIG. 1 is a block diagram showing the construction of an automatic focus detecting apparatus which is a first embodiment of the present invention.

FIG. 1 is a block diagram showing the construction of an automatic focus detecting apparatus which is a first embodiment of the present invention, and in the present embodiment, a case where the automatic focus detecting apparatus is incorporated in a photographing apparatus is supposed.

An interface circuit 202 is connected to an area sensor 201, and is also connected to a microcomputer 203 which is a processing apparatus, and the area sensor 201 has its area designation and its accumulation control effected by the microcomputer 203. The microcomputer 203 has a CPU (central processing unit) 204, an ROM 205, an RAM 206 and an EEPROM (electrically erasable programmable ROM) 207, and executes the focus detection processing operation in accordance with a program stored in the ROM 205.

The aberration information of a focus detecting optical system is pre-stored in the EEPROM 207 as by an adjusting process.

Figure 2:
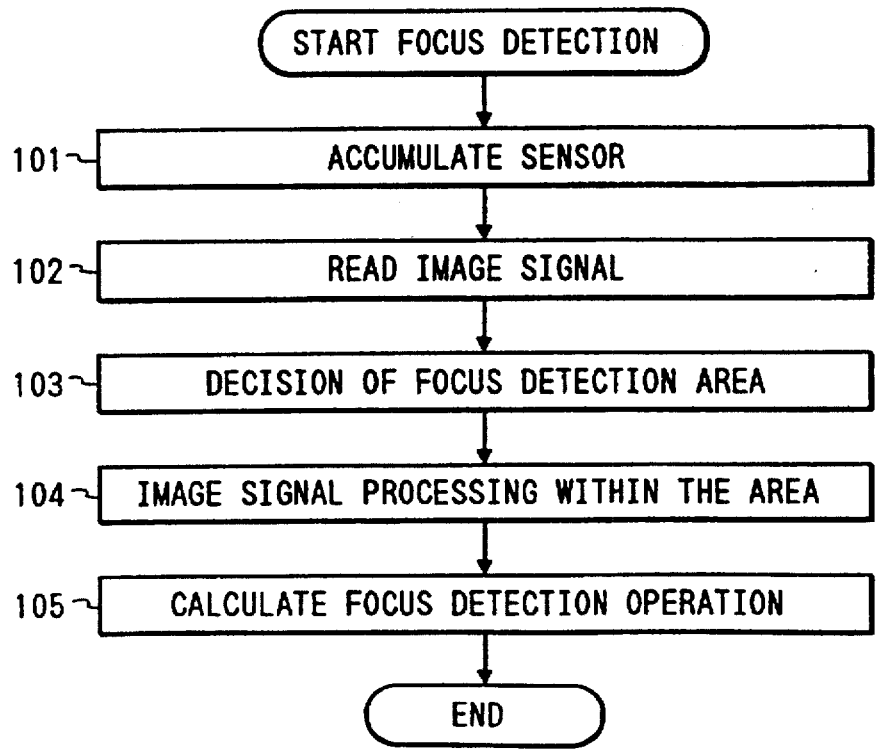
FIG. 2 is a flow chart of the focus detecting process program of the automatic focus detecting apparatus of FIG. 1.

FIG. 2 is a flow chart of the focus detecting process program of the automatic focus detecting apparatus, and this program is stored in the ROM 205 as previously described.

When the microcomputer 203 starts its focus detecting process, at a step 101, sensor accumulation is executed, and at a step 102, an object image signal accumulated in the area sensor 201 is read out.

Figure 3A:
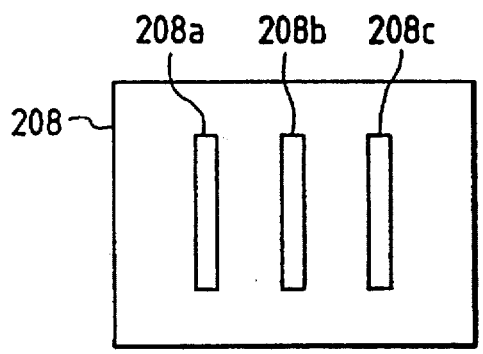
Figure 3B:
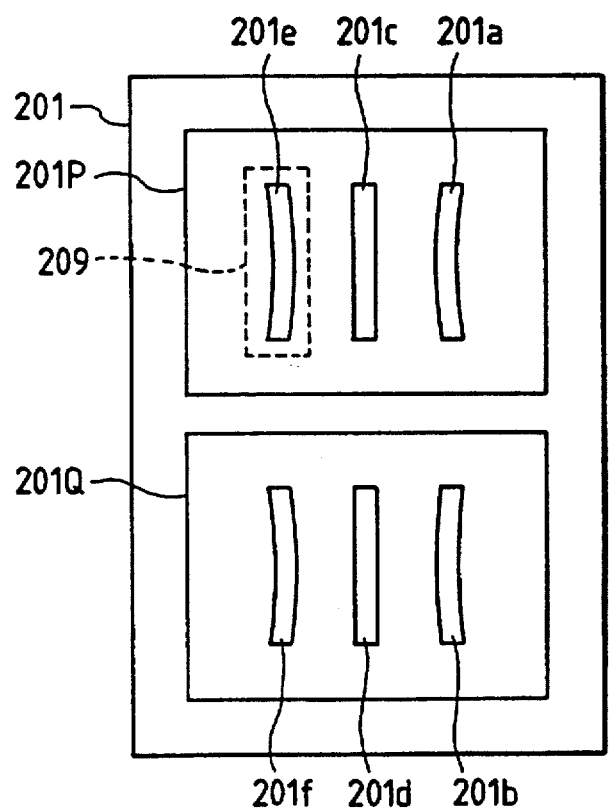

FIG. 3A shown the photographing image field 208 and an area on the area sensor 201 which corresponds thereto, and in the present embodiment, an area relatively widely covering the three pairs of areas (201a, 201b), (201c, 201d) and (201e, 201f) of the area sensor 201 shown in FIG. 3B is designated.

When the reading of the image signal of a predetermined area is completed, advance is made to a step 103, where the focus detection area is determined. When the focus detection area on the photographing image field 208 is determined, a selection area on the area sensor 201 is calculated on the basis of the aberration information of the optical system stored in the EEPROM 207. The object image signal of that area is then converted into a form suited for the focus detecting operation.

Assuming that the area on the photographing image field shown in FIG. 3A which is to be focus-detected has been determined to be area 209 (for the selection of this area, use is often made of a rule such as image field central area priority or the last selection result priority, but the description of the selection of the area is omitted herein), it is calculated from the aberration information of the optical system stored in the EEPROM 207 that the corresponding areas on the area sensor 201 are the areas 201e and 201f of FIG. 3B. The detailed aberration information regarding each position on the image field may be stored in the EEPROM 207, or the positions and shapes of several representative focus detection areas may be superimposed on the image field and the positions and shapes of areas on the area sensor 201 which correspond thereto may be memorized.

When at the step 103, the shape of the focus detection area on the area sensor 201 is calculated, at a step 104, the processing of the object image signal is carried out on the basis thereof.

Figure 4:
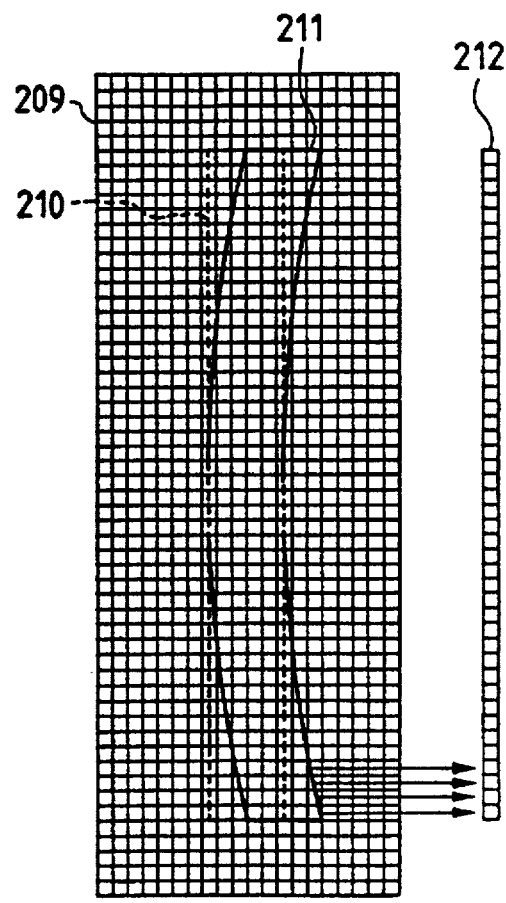
FIG. 4 shows a portion of the light receiving area of the area sensor of FIG. 1.

FIG. 4 shows a portion 209 (see FIG. 3B) of the light receiving area of the area sensor 201. A rectangular object area on the photographing image field 208 becomes not a rectangle like an area 210 indicated by broken line on the portion 209 of the area sensor 201, but a curved area 211 as indicated by solid line under the influence of the aberrations of the optical system. Accordingly, if an attempt is made to detect the focus of the rectangular object area on the image field, the image signal of the picture element of the area 211 must be processed.

In the actual focus detecting operation, for example, in the phase difference detection system, the phase difference in a one-dimensional direction is detected and therefore, it is necessary that the object information of an area having a two-dimensional direction be converted into one-dimensional information. For that purpose, as shown in FIG. 4, by the use of the object image signal stored in the RAM 206 in the microcomputer 208, the image signal in the horizontal direction in the area can be added to each picture element unit in the vertical direction to make a one-dimensional image signal 212, and as a result, the focus detection operation is carried out for the one-dimensional image signal 212.

At the next step 105, the focus state of a desired photographing image field area is detected from the one-dimensional image signal made at the step 104, by a conventional focus detection operation.

FIG. 8 shows the construction of the optical system of the automatic focus detecting apparatus using the area sensor 201, and the basic principle of this optical system follows the conventional form shown in FIG. 7 and therefore, in FIG. 8, constituents identical to those in FIG. 7 are given identical reference numerals. A field mask 258 is provided at a location near the predetermined imaging plane of a photo-taking lens, not shown, and an area limited by a single wide opening 258R is a range capable of accomplishing focus detection. A stop plate 259 is placed short of a secondary imaging lens 253, and stop openings 259P and 259Q regulate light beams incident on the respective positive lenses of the secondary imaging lens 258. The location of the stop plate 259 is in such a relation that the light beams are substantially imaged at the position of the exit pupil of the photo-taking lens by the power of a field lens 251.

The secondary imaging lens 258 comprising a pair of positive lenses causes the object image determined by the opening 258R to be re-imaged on the pair of light receiving areas 201P and 201Q of the area sensor 201. The object image signals on the two light receiving areas 201P and 201Q of the area sensor 201 are read out as electrical signals as described above, and the focus detection operation is executed in the processing apparatus.

In FIG. 8, the area sensor 201 is shown as having two spaced-apart light receiving areas 201P and 201Q, but alternatively, the light receiving areas may be a series of light receiving areas if they can provide a predetermined control property.

Generally, a main object and its background coexist in the photographing image field and therefore, the image field area which is the object of focus detection must be restricted in some form or other.

In the example of the prior art shown in FIG. 7, the openings 252a, 252b and 252c in the multiaperture field mask 252 serve to optically restrict the area. Therefore, only sensor arrays of a shape corresponding to the openings 252a, 252b and 252c can be disposed on the predetermined imaging plane of the secondary imaging lens 253.

However, in the form as shown in FIG. 8 which uses the area sensor 201, there is no means for optically restricting the area and therefore, electrical means must be provided to restrict the image field area. Specifically, it is necessary to selectively read, for example, the object image information of a portion of the light receiving area of the area sensor 201, or selectively calculate the information of a particular area in the object image information read in a wide range, thereby detecting the focus state in a localized area of the photographing image field, and electrical processing is effected as previously described.

Also, the automatic focus detecting apparatus in the aforedescribed form using the area sensor 201 has a plurality of focus detection areas and is designed such that in order to make the positions thereof variable, the opening 258R in the field mask 258 is made large, whereby a wide range of object image is formed on the area sensor 201, and this may lead to the following problem. That is, the object image becomes large over the entire area sensor 201, and the image formed on the marginal portion of the area sensor 201 becomes not a little distorted under the influence of the aberrations of the optical system. Generally, in a focus detecting optical system, unlike a photographing optical system, aberrations are great because of limitations in the system construction.

The aberrations of the focus detecting optical system will now be described with reference to FIG. 3. On the light receiving areas 201P and 201Q of the area sensor 201 shown in FIG. 3B, the areas 208a, 208b and 208c corresponding to the rectangular image fields in the photographing image field 208 correspond to areas (201a, 201b), (201c, 201d) and (201e, 201f), and particularly, marginal portions loosely depict an arc. Of course, depending on the construction of the focus detecting optical system, this aberration may sometimes be bent in the direction opposite to the direction indicated in FIG. 3B.

Accordingly, if the shape of the focus detection areas set on the photographing image field are applied to the surface of the area sensor 201 and the selection of the object image information is effected, correct focus detection will not be effected particularly in the marginal portion of the image field. Consequently, in the present embodiment, the signal processing described in connection with FIG. 4 is effected.

Description will now be made of the internal construction of the area sensor 201 shown in FIG. 1. In the following description, one of the areas 201P and 201Q of the area sensor 201 will be described, but the internal construction of the other area is similar, too.

The area sensor 201 has the following three functions.

It can arbitrarily designate a plurality of areas to be focus-detected.

It can detect the peak value of the quantity of light in the designated area.

It can add a quantity-of-light signal in a direction orthogonal to the direction of the picture element of which the peak value is detected.

(1) General Construction

Figure 5:
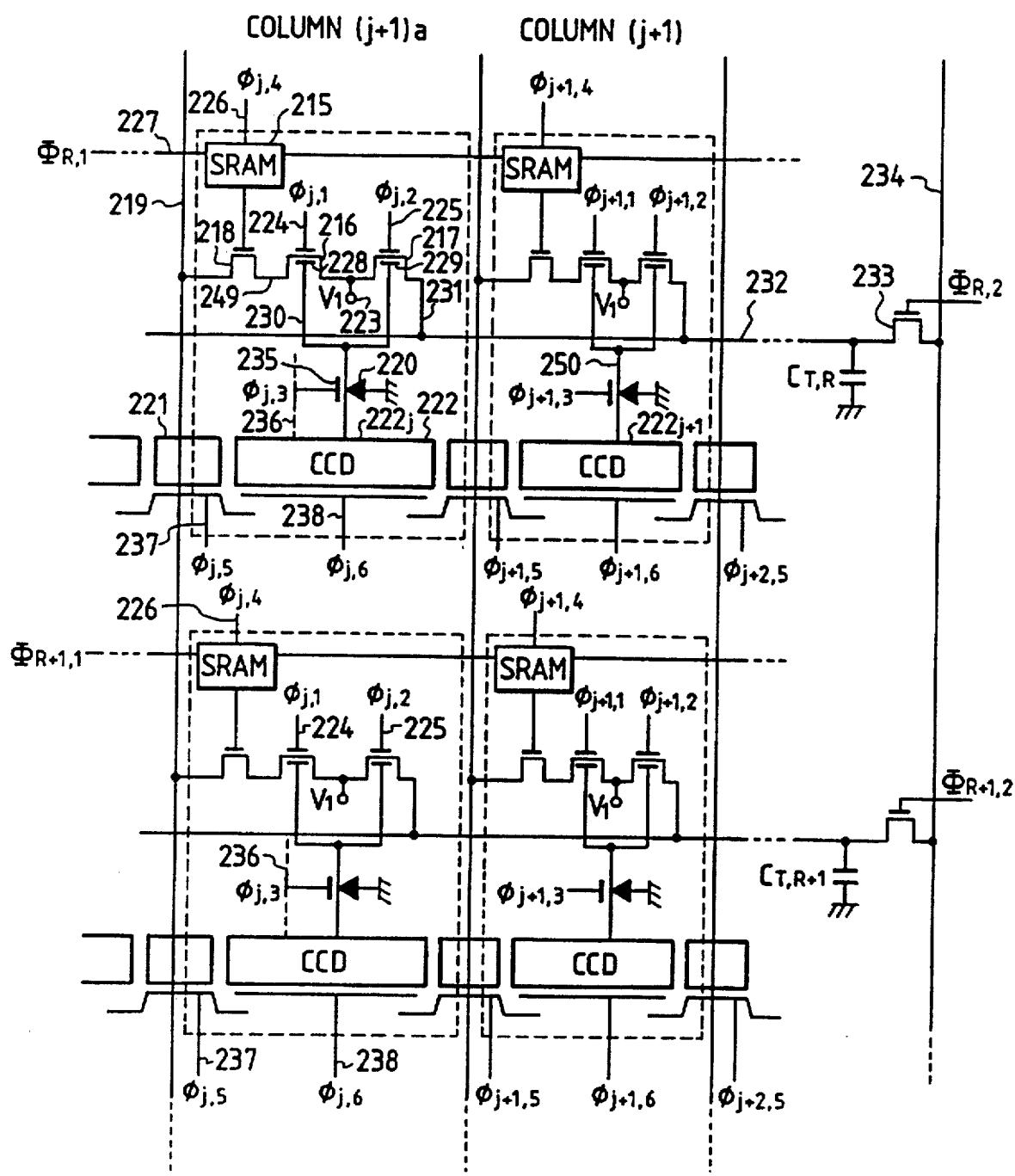
FIG. 5 is a circuit diagram of the area sensor of FIG. 1.

FIG. 5 is a circuit diagram of the rows R-R+1 and columns j-j+1 of the area sensor 201.

The constituents of a picture element will hereinafter be described with attention paid to the row R and the column j. The reference numeral 215 designates an SRAM for designating a focus area, the reference numerals 216 and 217 denote amplifiers, the reference numeral 218 designates a switch, the reference numeral 219 denotes an output line Pout,j for detecting the peak value of a quantity-of-light signal in the designated area of picture elements arranged in a vertical direction, the reference numeral 220 designates a photodiode for electric conversion, and the reference numerals 221 and 222 denote charge transferring CCDs.

The amplifiers 216 and 217 are connected to a voltage source V1 shown at 223, and a pulse $\phi j,1$ and a pulse $\phi j,2$ can be applied to the respective gates thereof by vertical lines 224 and 225 common in the column j portion. Also, a pulse $\phi j,4$ and a pulse $\Phi R,1$ can be applied to the SRAM 215 by a vertical line 226 and a horizontal line 227, respectively. The photodiode 220 for photoelectric conversion is connected through sensing channels 228, 229 and 230 under the gates of the amplifiers 216 and 217. Further, the source side electrode 231 of the amplifier 217 is connected to a horizontal reading line 232, to which a signal reading capacity CT,R is connected, and which is further connected to a common vertical reading line 234 through a switch 233.

Also, an electrode 235 is provided on the upper surface of the photodiode 220 for photoelectric conversion with oxide film interposed therebetween, and a pulse $\phi j,3$ is applied thereto through a common vertical line 236. Pulses $\phi j,5$ and $\phi j,6$ are applied to the charge transferring CCDs 221 and 222, respectively, by common vertical lines 237 and 238.

(2) Element Structure

Figure 6A:
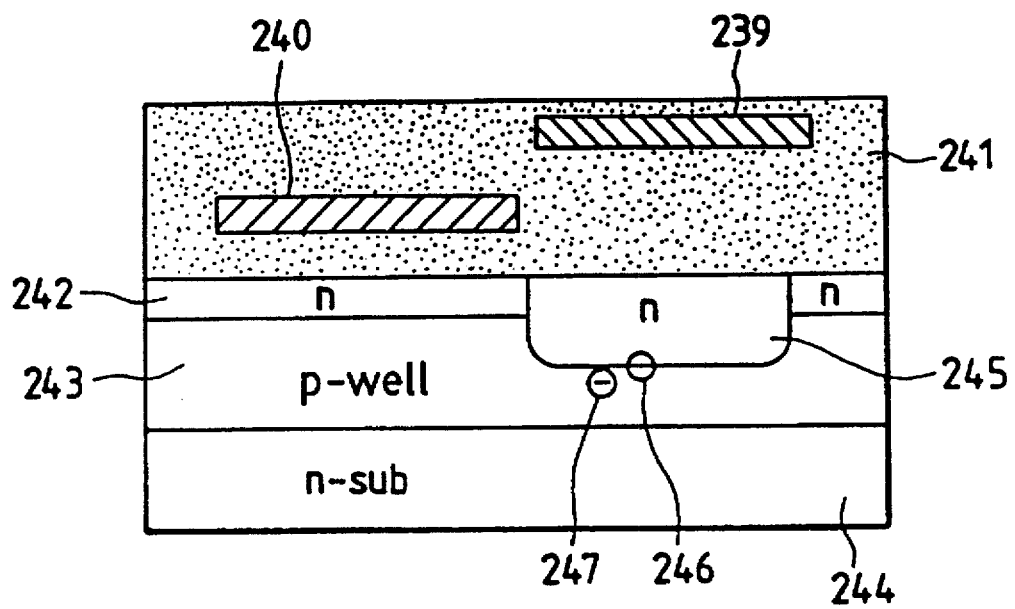
FIGS. 6A and 6B are cross-sectional views showing the element structure of the area sensor of FIG. 1.
Figure 6B:
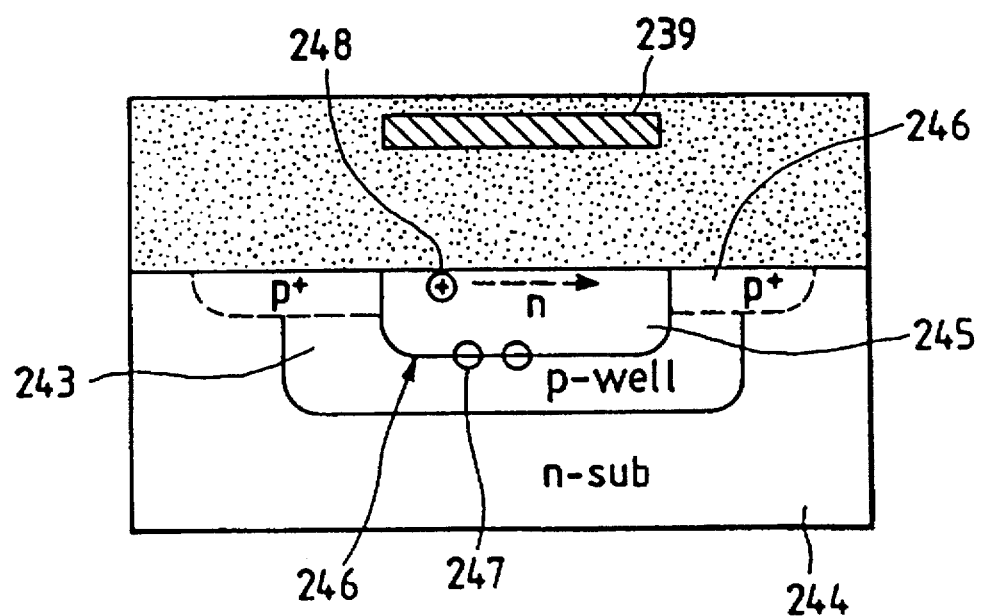

FIGS. 6A and 6B are cross-sectional views showing the element structure of the area sensor 201.

FIG. 6A is a cross-sectional view of the element in the beneath-the-gate portion and the photoelectric converting portion of the amplifiers 216, 217 in the circuit diagram of FIG. 5, and FIG. 6B is a cross-sectional view of the element in the source, gate and drain portions of the amplifiers 216, 217.

The reference numeral 239 designates the gate electrode of the amplifiers 216, 217, and in order to reduce the gate capacity thereof, the thickness of the oxide film between it and a channel layer below it is about 1,000. The reference numeral 240 denotes an electrode on the photoelectric converting portion (photodiode 220) which enables a carrier accumulated in the photoelectric converting portion to be transferred to the sensing channels 228 and 229 by a bias relation applied to electrodes 289 and 240. The reference numeral 241 designates an insulating layer (for example, $SiO_2$ layer), and the reference numeral 242 denotes an n type diffusing layer for preventing a depletion layer from contacting with the interface between Si and $SiO_2$, and this diffusing layer 242 suppresses the production of a dark current. The reference numeral 243 designates a p well layer, and the reference numeral 244 denotes an n type substrate. The p well layer 243 is depleted because reverse bias is applied to between the p well layer 243 and the n type substrate 244. The reference numeral 245 designates an n layer formed more deeply than the n type diffusing layer 242, and a carrier (electron) 247 produced in the photoelectric converting portion is transferred to the interface 246 between the n layer 245 and the p well layer 248, and a carrier (electron hole) 248 flowing between the drains and source shown in the n type substrate 244 and the interface 246 is modulated by said carrier, whereby there is provided the amplifying function.

(3) Operation (First)

The operation of the area sensor 201 will now be described with reference to FIG. 5. A first operation is the operation of effecting charge accumulation by each column, detecting the peak thereof, and effecting signal addition when the signal of the column under attention is deficient.

(a) Designation of the Focus Area

Writing is effected into the SRAM 215 provided in each picture element portion by pulses $\phi j,4$ and $\Phi R,1$ (j and R being the column number and the row number, respectively, of the selected area). When this picture element into which writing has been effected is the row R and the column j, the output terminal 249 of the amplifier 216 is connected to the peak detecting vertical line 219 because the output of the SRAM 215 is connected to the switch 218.

(b) Accumulating Operation

Pulses $\phi j,1$, $\phi j,2$, $\phi j,3$, $\phi j,5$ and $\phi j,6$ are applied so that the sensing channel 228 of the amplifier 216 may become highest as potential. The carriers produced in the photoelectric converting portion by this potential all flow into the sensing channel 228 of the peak detecting amplifier 216. By the principle illustrated in FIG. 6B, the output of the amplifier 216 is modulated by the carriers in this sensing channel 228 and is put out to the peak detecting output line 219. In this case, the amplified electron hole and the electron created by photoelectric conversion exist in different areas and the re-coupling thereof does not take place.

(c) Termination of Accumulation and Horizontal Line Reading

The peak value of the-picture element in the designated light receiving area in the column direction is detected by each peak detecting output line Pout,j shown at 219 during the accumulation period. Accordingly, the potential of the sensing channel 229 of the amplifier 217 is made highest by the pulses $\phi j,1$, $\phi j,2$ and $\phi j,3$ when in the focus area, the peak output of the vertical line in which the focus signal is to be detected reaches a desired value (when, for example, the accumulation in the column j is terminated). Thereby, the carrier produced by photoelectric conversion which has been accumulated in the sensing channel 228 of the amplifier 216 is transferred to the sensing channel 229 of the amplifier 217 through the sensing channel 230, and the amplified signal is read by a capacity CT,R through the horizontal reading line 232.

(d) Output Line Reading

The signal read by each capacity CT,R is output to the output line 234 by a pulse $\Phi R,2$ through the switch 233.

(e) Operation of Adding Horizontal Picture Elements

When, for example, the peak value of the vertical line in which a focus signal is to be detected is not sufficient even during the greatest accumulation time required in the system, horizontal line reading is not effected simultaneously with the termination of the accumulation shown at time (c) above, but the addition of horizontal picture elements is effected. In this case, after the termination of the accummulation, the signal carrier accumulated in the sensing channel 228 of the peak detecting amplifier 216 is transferred to the charge transferring CCD 222 (e.g. the CCD shown at 222j in the case of the column j) connected to the photodiodes 220 and 250 for photoelectric conversion of the respective picture element columns. In the case of the column j, this can be executed by the pulses $\phi j,1$ $\phi j,3$ and $\phi j,5$.

Subsequently, the carrier in the horizontal direction is added. For example, when the signal of the column (j+1) is to be added to the column j, the carrier of the charge transferring CCD 222j+1 in the picture element portion of the column (j+1) is transferred to the charge transferring CDD 222j in the column j by pulses $\phi j+1,5$ and $\phi j+1,6$. By thus operation, the carriers in the column j and the column (j+1) are added. If after the addition, the potential of the sensing channel 229 of the reading amplifier is made high by the pulses $\phi j,1$, $\phi j,2$ and $\phi j,3$ and the carrier is transferred to the sensing channel 229 and reading is effected, the added signal is output to the horizontal reading line 218.

The method of adding the signals of the column j and the column (j+1) has been described above, whereas this signal addition is not limited to two columns, but the addition of a number of columns is also possible by the pulse of each CCD.

(4) Operation (Second)

A second operation is the operation of effecting signal addition in the designated area during the accumulating operation.

(f) Designation of the Automatic Focus Area

The operation of writing into the SRAM 215 provided in each picture element portion by pulses $\phi j,4$ and $\Phi R,1$ is similar to the first operation.

(g) Accumulating Operation

Description will now be made of an example in which the signal addition of the column j and the column (j+1) is effected in a two-dimensional area designated by item (f) above from during the accumulating operation.

The potentials of respective semiconductor layers determined by pulses $\phi j,1$, $\phi j,2$, $\phi j,3$, $\phi j,5$, $\phi j,6$, $\phi j+1,1$, $\phi j+1,1$, $\phi j+1,2$, $\phi j+1,3$, $\phi j+1,5$ and $\phi j+1,6$ are defined as $V\phi j,1$, $V\phi j,2$, $V\phi j,3$, $V\phi j,5$, $V\phi j,6$, $V\phi j+1,1$, $V\phi j+1,2$, $V\phi j+1,3$, $V\phi j+1,5$ and $V\phi j+1,6$, respectively.

In this case, $$V\phi j,2, V\phi j,3 < V\phi j,1 \tag{1}$$

$$V\phi j+1,1, V\phi j+1,2 < V\phi j+1,3 \tag{2}$$

Said pulses are applied so as to satisfy the foregoing expressions (1) and (2). If such a potential relation is kept, carriers produced by the photodiodes 220 and 250 for photoelectric conversion are all collected in the sensing channel 228 of the amplifier 216. Thereby, an addition signal corresponding to two picture elements in the horizontal direction is read by the peak output line 219 during the accumulation period.

(h) Termination of Accumulation, and Horizontal Line Reading

This is the same as the first operation.

(i) Output Line Reading

This is the same as the first operation.

In the above-described first embodiment, a method of adding image information pre-read in a wide range in the microcomputer 3 is adopted as the method of converting the two-dimensional object image information of the selected area on the area sensor 201 into one-dimensional image information, but a method of determining the control area by the utilization of the aforedescribed add function of picture element signals, and processing it as one-dimensional information in the area sensor 201 and outputting it may be adopted as an alternative method of using the area sensor 201.

Also, in the foregoing description, optical aberration information is used as the information regarding the characteristic of the optical system, but it is also possible to use information regarding so-called parallax adjustment which is the correspondence between the position in the finder and the position on the sensor chip as the information of the optical system. This omits the steps of process which have originally required mechanical adjustment to a certain degree and replaces the remaining amount of adjustment with electrical adjustment and thus, it becomes possible to greatly simplify the adjusting step.

Figure 9:
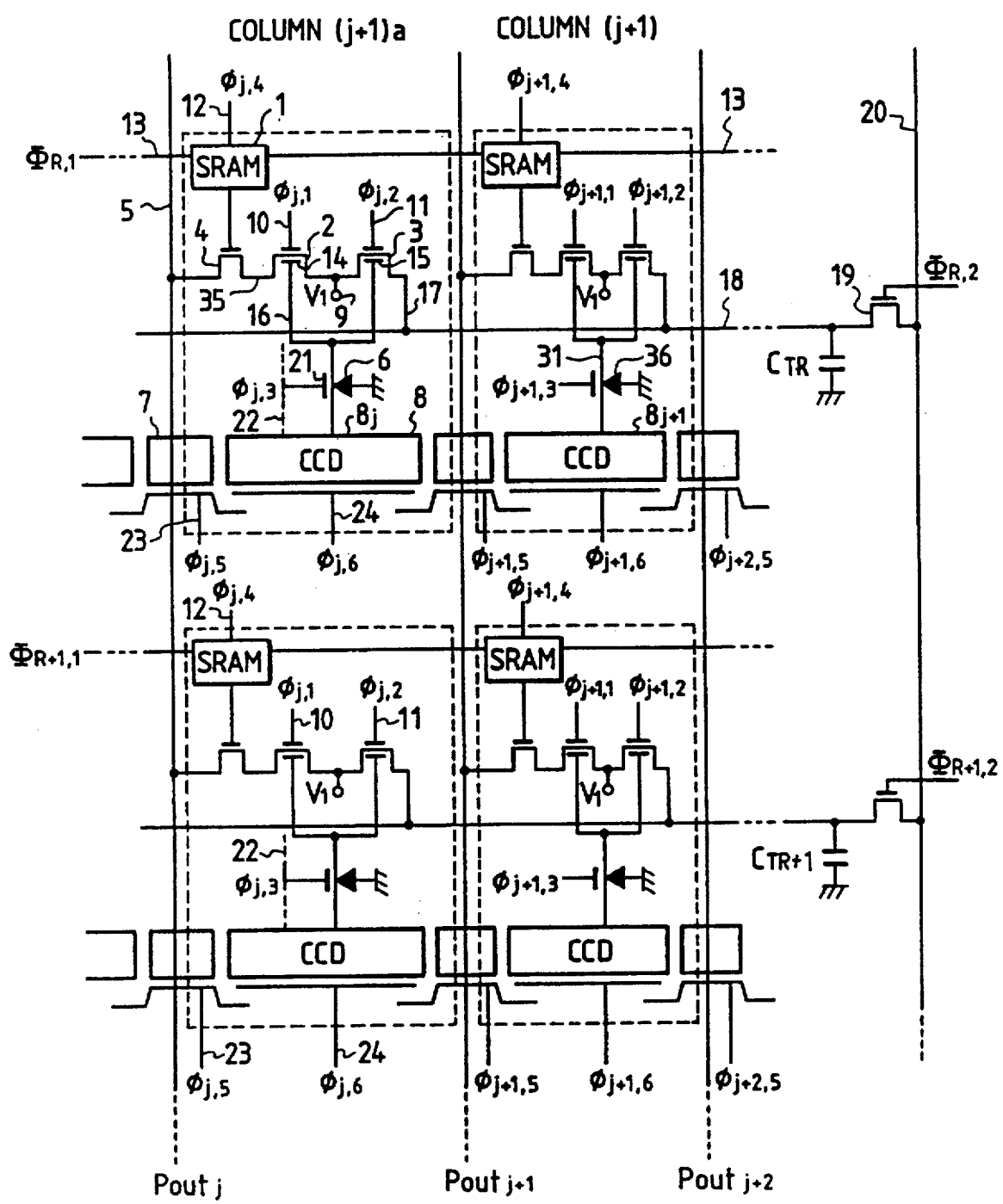
FIG. 9 diagrammatically shows the construction of a semiconductive photoelectric area sensor which is a second embodiment of the present invention.
Figure 10A:
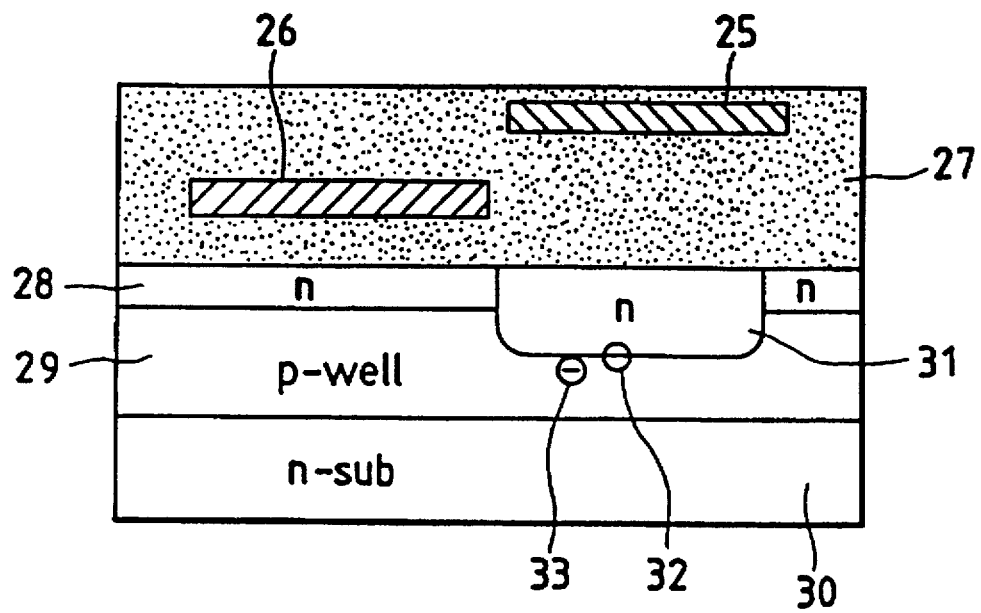
FIGS. 10A and 10B are cross-sectional views three-dimensionally showing the element construction of the photoelectric area sensor of FIG. 9.
Figure 10B:
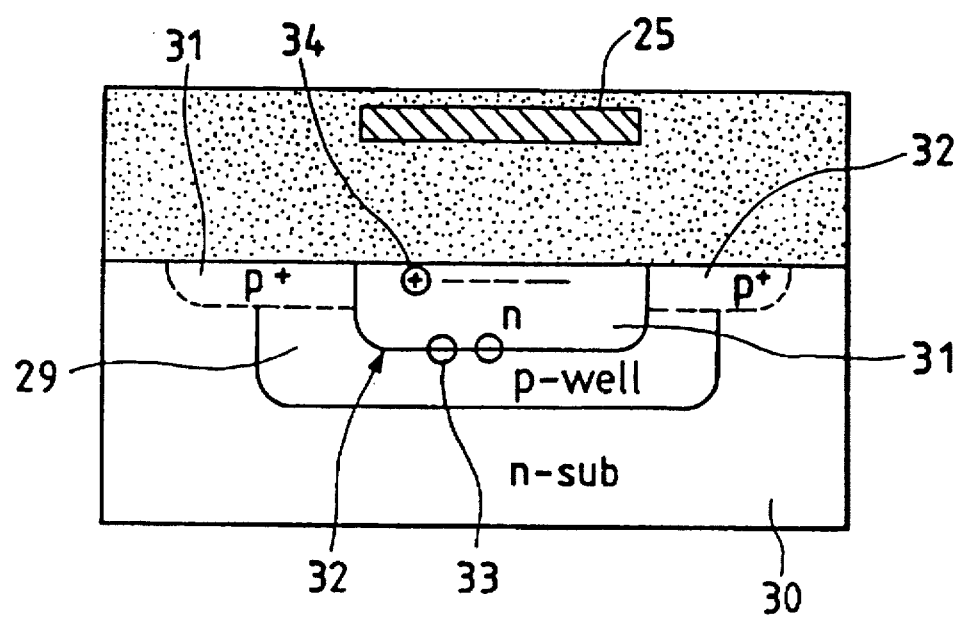
Figure 11:
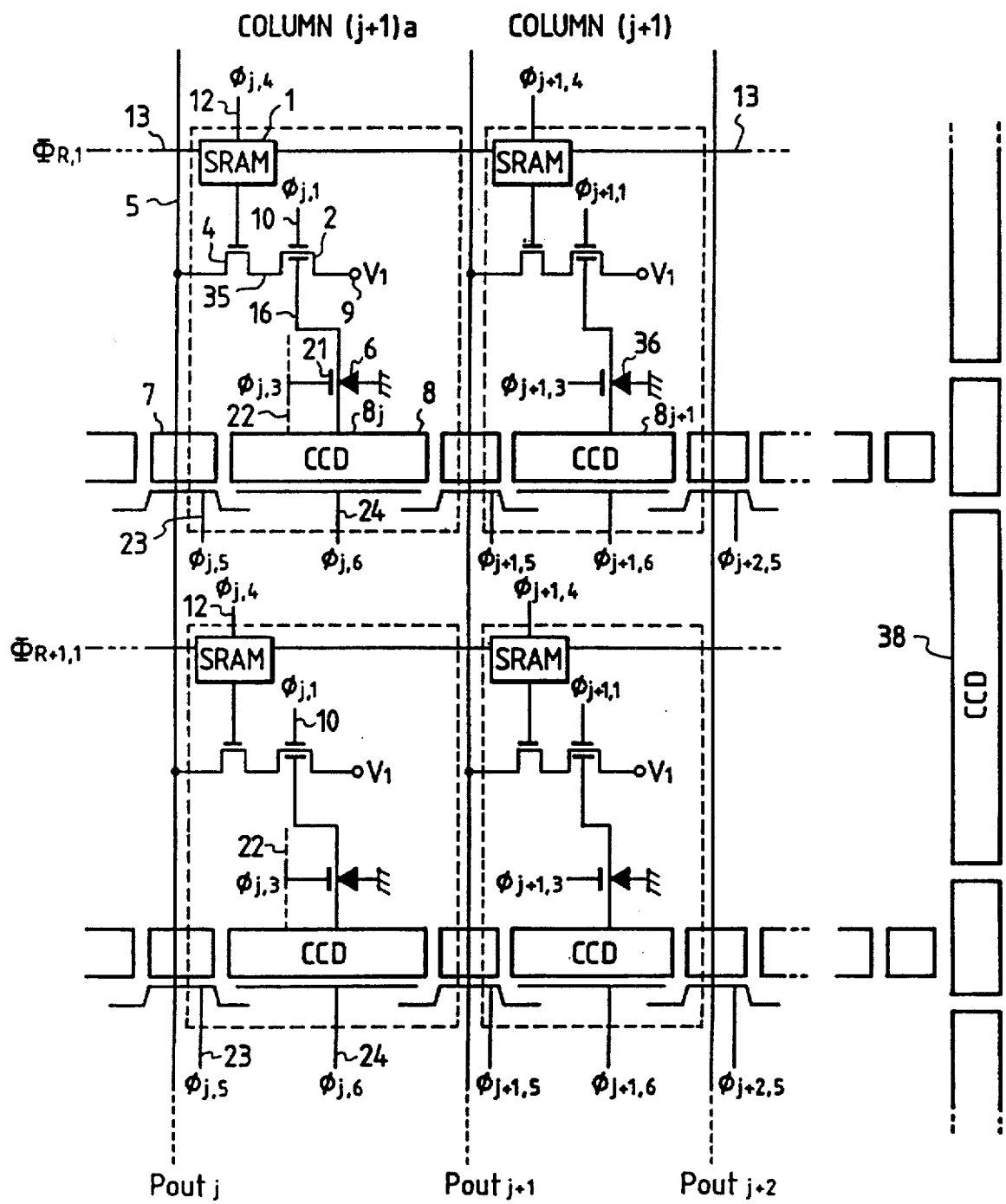
FIG. 11 diagrammatically shows the construction of a semiconductive photoelectric area sensor which is a third embodiment of the present invention.
Figure 12:
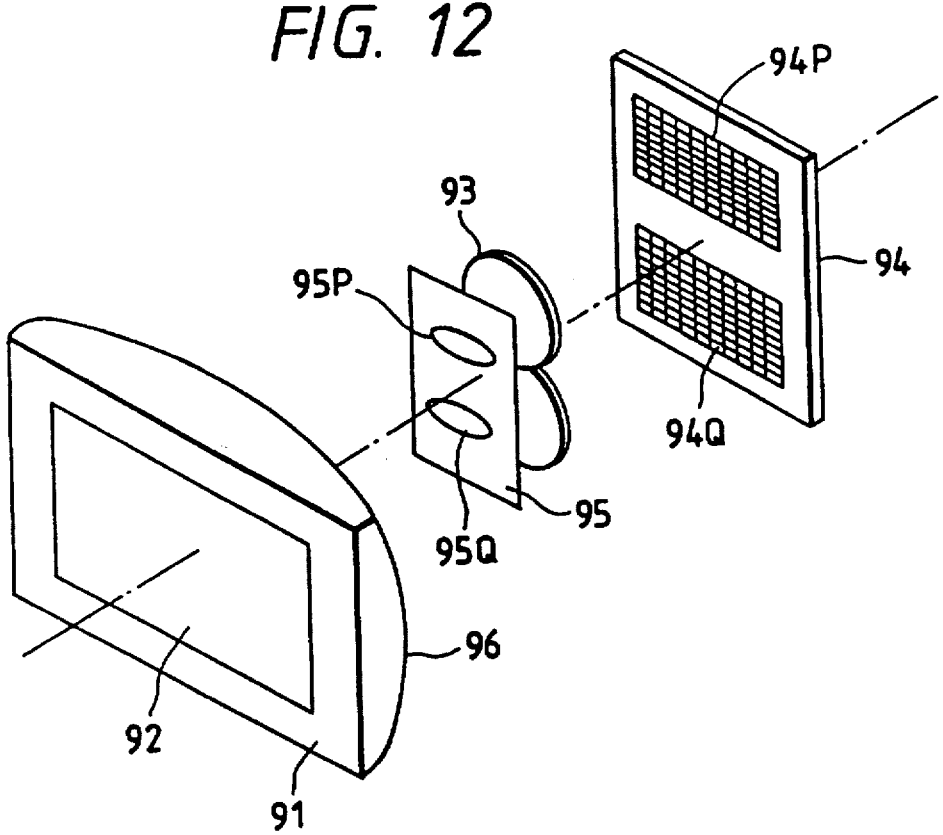
FIG. 12 shows an automatic focusing optical system of the phase difference detection type using the semiconductive photoelectric area sensor according to the present invention.

FIG. 9 shows the construction of a semiconductive photoelectric area sensor which is a second embodiment of the present invention, FIGS. 10A and 10B are cross-sectional views three-dimensionally showing the element construction of the same semiconductive photoelectric area sensor, and FIG. 11 shows the construction of a semiconductive photoelectric area sensor which is a third embodiment of the present invention. FIG. 12 shows an automatic focusing optical system of the phase difference detection type using the semiconductive photoelectric area sensor according to each embodiment of the present invention.

An example of the automatic focus detecting operation will first be described with reference to FIG. 12.

As shown in FIG. 12, a field mask plate 91 is provided near the predetermined imaging plane of a photo-taking objective lens, not shown, and the interior of a single wide distance measuring field opening 92 is a defined focus detection range. A secondary imaging lens 93 comprising a pair of lenses causes an object image defined by the slit of the distance measuring field opening 92 to be re-imaged on the pair of light receiving areas 94P and 94Q of a photoelectric area sensor 94. As regards the received light information of the pair of light receiving areas 94P and 94Q of the photoelectric area sensor 94, the localized image information of the corresponding position is read as an electrical signal, which is subjected to correlation calculation, whereby a value representative of the focus adjusted state of the objective lens for the object at each position is calculated.

A stop plate 95 is disposed on the side of the secondary imaging lens 93, facing field lens 96 and a pair of stop openings 95P and 95Q therein regulate light beams incident on the respective lenses. The stop plate 95 is placed so as to be substantially in imaging relationship with the position of the exit pupil of the photo-taking objective lens by field lens 98.

The photoelectric area sensor 94 has the following functions:

1) It can arbitrarily designate a plurality of areas to be focus-detected;

2) It can detect the peak value of the quantity of light in the designated area; and 3) It can add a quantity-of-light signal in a picture element direction orthogonal to the picture element direction in which the peak value is detected.

In FIG. 12, the photoelectric area sensor 94 is shown as having two spaced-apart light receiving areas 94P and 94Q, but it may have a sequence of light receiving areas If they can provide a predetermined control property. Generally two images are separated from each other and therefore, a boundary area which is not optically used is formed between the two optical images and thus, it is more advantageous in reducing the chip size to construct a surrounding circuit in this portion.

Figure 13:
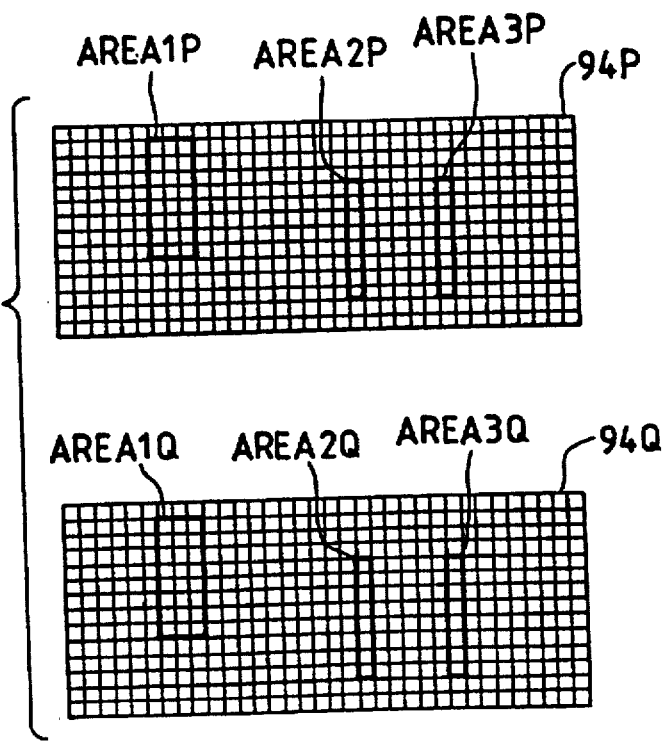
FIG. 13 shows the picture element blocks of the photoelectric area sensor of FIG. 12.

In the phase difference detection system, it is generally the principle to take comparative correlation between the corresponding positions of two optical images and therefore, each of the plurality of focus detection areas arbitrarily designated by the function of item (1) above has a corresponding detecting picture element block in each of the pair of light receiving areas 94P and 94Q of the photoelectric area sensor 94. As shown, for example, in FIG. 13, picture element blocks AREA1P and AREA1Q must basically be designated as the same shape at the same corresponding position and at the same time. Likewise, for the other focus detection areas, picture element blocks AREA2P and AREA2Q must be correspondingly designated and picture element blocks AREA3P and AREA3Q must be correspondingly designated. However, between picture element blocks belonging to different focus detection areas, for example, between AREA1P and AREA2P, identity and simultaneity are not required.

Also, with regard to the addling function of item (3) above, it is necessary that the same handling be done between the blocks of the light receiving areas 94P and 94Q of the photoelectric area sensor 94. For example, when the arrays in the three columns of AREA1P and AREA1Q are to be added, the two must be added at a time.

Also, it is desirable that signals for AGC be output in common in the area astride the light receiving areas 94P and 94Q of the photoelectric area sensor 94. For example, one of a peak signal output from AREA2P and a peak signal output from AREA2Q which is relatively greater is selected and output so that both of AREA2P and AREA2Q may be accumulation-controlled by that selected output. By doing so, the simultaneity of the accumulation control of the picture element blocks AREA2P and AREA2Q between which comparative correlation should be taken is maintained and the incoincidence of the control by the irregularity of the circuit elements is eliminated. The number of designated areas is not limited to three, but a greater number of designated areas is more effective.

The internal construction of the photoelectric area sensor 94 will now be described in detail. In the following description, for simplicity, the structure of one of the pair of light receiving areas 94P and 94Q of the photoelectric area sensor 94 will be described.

(1) General Construction

FIG. 9 is a circuit diagram showing the construction of the photoelectric area sensor 94 for automatic focus which is the second embodiment of the present invention, particularly, the rows R-R+1 and columns j-j+1 of such area sensor 94.

The constituents of a picture element will hereinafter be described with attention paid to the row R and the column j. The reference numeral 1 designates an SRAM for designating the automatic focus area, the reference numerals 2 and 3 denote amplifiers, the reference numeral 4 designates a switch, the reference numeral 5 denotes an output line Pout,j for outputting the peak value of the quantity-of-light signal in the designated area of picture elements arranged in the vertical direction, the reference numeral 6 designates a photodiode for photoelectric conversion, and the reference numerals 7 and 8 denote charge transferring CCDs.

The amplifiers 2 and 3 are connected to a voltage source V1 designated at 9, and a pulse $\phi j,1$ and a pulse $\phi j,2$ can be applied to the respective gates thereof by common vertical lines 10 and 11 in the column j portion. Also, a pulse $\phi j,4$ and a pulse $\phi R,1$ can be applied to the SRAM 1 by a vertical line 12 and a horizontal line 13, respectively. The photodiode 6 for photoelectric conversion is connected through sensing channels 14, 15 and 16 under the gates of the amplifiers 2 and 3. Further, the source side electrode 17 of the amplifier 3 is connected to a horizontal reading line 18, to which a signal reading capacity CT,R is connected, and is further connected to a common vertical reading line 20 through a switch 19.

An electrode 21 is provided on the upper surface of the photodiode 6 for photoelectric conversion with oxide film interposed therebetween, and a pulse $\phi j,3$ is applied thereto through a common vertical line 22. Pulses $\phi j,5$ and $\phi j,6$ are applied to the charge transferring CCDs 7 and 8 by common vertical lines 23 and 24.

(2) Element Structure

FIG. 10A is an element cross-sectional view of the beneath-the-gate portions and photoelectric converting portions of the amplifiers 2 and 3 of FIG. 9, and FIG. 10B is an element cross-sectional view of the amplifiers 2 and 3 of FIG. 9 in the source, gate and drain portions thereof.

The reference numeral 25 designates the gate electrode of the amplifiers 2 and 3, and in order to reduce the gate capacity thereof, the thickness of the oxide film between it and the lower channel layer is about 1,000. The reference numeral 26 denotes an electrode on the photoelectric converting portion which enables a carrier accumulated in the photoelectric converting portion (the photodiode 6 for photoelectric conversion, etc.) to be transferred to the sensing channels 14 and 15 of the amplifiers 2 and 3 by the relation of the bias applied to the electrodes 25 and 26. The reference numeral 27 denotes an insulating layer (for example, $SiO_2$ layer), and the reference numeral 28 designates an n type diffusing layer for preventing a depletion layer from contacting with the interface between Si and $SiO_2$. and this diffusing layer suppresses the production of a dark current. The reference numeral 29 denotes a p well layer, and the reference numeral 30 designates an n type substrate. Reverse bias is applied to between the p well layer 29 and the n type substrate 30 and therefore, the p well portion 29 is depleted. The reference numeral 31 denotes an n layer formed more deeply than the n type diffusing layer 28. A carrier (electron) 33 created in the photoelectric converting portion is transferred to the interface 32 between the n layer 31 and the p well layer 29, and a carrier (electron hole) 34 flowing between the drain and source shown in the n type substrate 30 and the interface 32 is modulated by said carrier, whereby there is provided the amplifying function.

(3) Operation (1)

The operation of the area sensor according to the present invention will now be described with reference to FIG. 9.

Operation (1) is the operation of first accumulating charges by each column, detecting the peak thereof, and effecting addition when the signal of the column to which attention is paid is deficient.

(a) Designation of the Automatic Focus Area

Writing is effected into the SRAM 1 provided in each picture element portion by pulses $\phi j,4$ and $\phi R,1$ (j and R being the column number and the row number, respectively, of the selected area). When this written-in picture element is the row R and the column j, the output terminal 35 of the amplifier 2 is connected to the peak detecting vertical line 5 because the output of the SRAM 1 is connected to the switch 4.

(b) Accumulating Operation

Pulses $\phi j,1$, $\phi j,2$, $\phi j,3$, $\phi j,5$ and $\phi j,6$ are applied so that the sensing channel 14 of the amplifier 2 may become highest as potential. By this potential, carriers created in the photoelectric converting portion all flow into the sensing channel 14 of the peak detecting amplifier 2. By the principle shown in FIG. 10B, the output of the amplifier 2 is modulated by the carrier in this sensing channel 14 and is put out to the peak detecting output line 5. In this case, the amplified electron hole and the electron produced by photoelectric conversion are in different areas and the re-coupling thereof does not take place.

(c) Termination of Accumulation and Horizontal Line Reading

The peak value of the picture element of the designated light receiving area in the row direction is detected by each peak detecting output line Pout,j shown at 5 during the accumulation period. Accordingly, when in the area for automatic focus, the peak output of the vertical line from which the automatic focus signal is to be detected reaches a desired value (for example, when the accumulation in the row j is terminated), the potential of the sensing channel 15 of the amplifier 3 is made highest by the pulses $\phi j,1$, $\phi j,2$ and $\phi j,3$. Thereby, the carrier created by photoelectric conversion and accumulated in the sensing channel 14 of the amplifier 2 is transferred to the sensing channel 15 of the amplifier 3 through a sensing channel 16, and the amplified signal is read by the capacitor CT,R through the horizontal reading line 18.

(d) Output Line Reading

The signal read by each capacitor CT,R is output to the output line 20 by a pulse $\phi R,2$ through the switch 19.

(e) Operation of Adding Picture Elements in Lateral Direction

For example, when the peak value of the vertical line which has been about to detect an automatic focus signal is not sufficient even during the maximum accumulation time required in the system, horizontal line reading is not effected simultaneously with the termination of the accumulation shown in item (c) above, but the addition of picture elements in the lateral direction is effected. In this case, after the termination of the accumulation the signal carrier accumulated in the sensing channel 14 of the peak detecting amplifier 2 is transferred to the charge transferring CCD 8 connected to the Photodiode for electric conversion in each picture element column (for example, in the case of the column j, the CCD shown at 8j). In the case of the column j, this can be executed by the pulses $\phi j,1$, $\phi j,3$ and $\phi j,5$.

Subsequently, the carrier in the horizontal direction is added. For example, when the signal in the column (j+1) is to be added to the column j, the carrier in the charge transferring CCD (8j+1) of the picture element portion in the column (j+1) is transferred to the charge transferring CCD (8j) in the column j by pulses $\phi j+1,5$ and $\phi j+1,6$. By this operation, the carriers in the column j and the column (j+1) are added. If after the addition, the potential of the sensing channel 15 of the reading amplifier 3 is made high by the pulses $\phi j,1$, $\phi j,2$ and $\phi j,3$ and the carrier is transferred to the sensing channel 15 and reading is effected, the addition signal is output to the horizontal reading line 18.

While the method of addition of the column j and the column (j+1) has been described above this addition is not limited to two columns, but the addition of a number of columns is also possible by the pulses of the CCDs.

(4) Operation (2)

Operation (2) is the operation of effecting addition in a designated area during the accumulating operation.

(f) Designation of the Automatic Focus Area

The operation of writing into the SRAM 1 provided in each picture element portion by pulses $\phi j,4$ and $\phi R,1$ is similar to operation (1).

(g) Accumulating Operation

Description will hereinafter be made of an example in which in the two-dimensional area designated by (i), the addition of the column j and the column (j+1) is effected from during the accumulating operation.

The potentials of the respective semiconductor layers determined by pulses $\phi j,1$, $\phi j,2$, $\phi j,3$, $\phi j,5$, $\phi j,6$, $\phi j+1,1$, $\phi j+1,2$, $\phi j+1,3$, $\phi j+1,5$ and $\phi j+1,6$ are defined as $V\phi j,1$, $V\phi j,2$, $V\phi j,3$, $V\phi j,5$, $V\phi j,6$, $V\phi j+1,1$, $V\phi j+1,2$, $V\phi j+1,3$, $V\phi j+1,5$ and $V\phi j+1,6$, respectively.

In this case, $$V\phi j,2, V\phi j,3 < V\phi j,1 \tag{3}$$

$$V\phi j+1,1, V\phi j+1,2 < V\phi j+1,3 < V\phi j+1,6 < V\phi j+1,5 < V\phi j,6 < V\phi j,3 \tag{4}$$

Said pulses are applied so as to satisfy the above expressions (3) and (4). Thereby if the carriers created by the photodiodes 6 and 36 for photoelectric conversion, etc. are kept in the relation of potentials as described above, they are all collected in the sensing channel 14 of the amplifier 2. Thereby, during the accumulation period, an addition signal corresponding to two picture elements in the horizontal direction is read by the peak detecting output line 5.

(h) Termination of Accumulation and Horizontal Line Reading

This is the same as operation (1).

(i) Output Line Reading

This is the same as operation (1).

Figure 14:
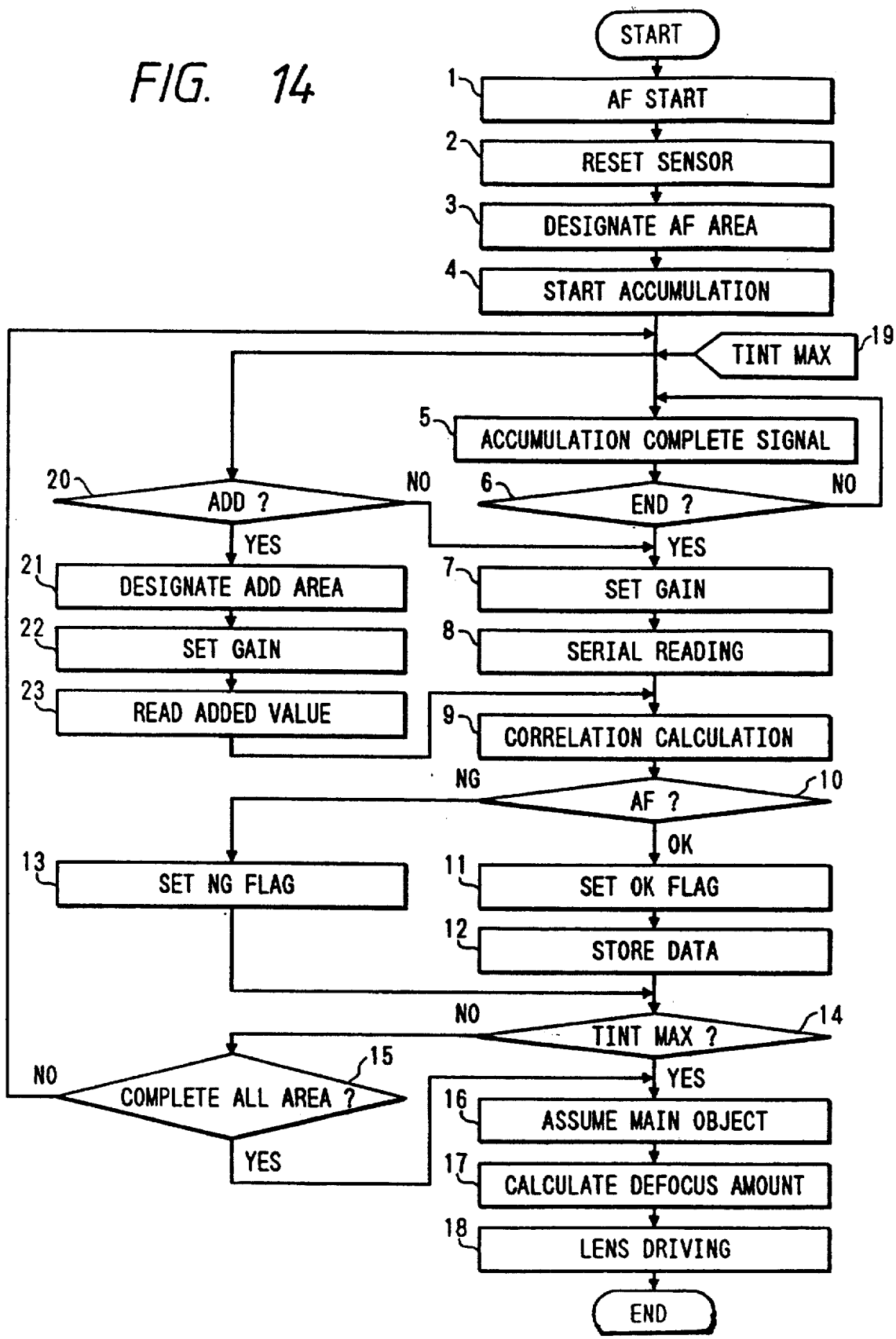
FIG. 14 is a flow chart of automatic focus detection in a case where the photoelectric sensor in the second embodiment is used.

FIG. 14 is a flow chart of the automatic focus detection when the photoelectric area sensor according to the present invention is used. The automatic focus detecting operation in a camera using the photoelectric area sensor shown in FIG. 9 and the optical system for auto focus shown in FIG. 12 will now be described with reference to FIG. 14. Here, description will be made with an ordinary camera as an example, but the same thing also holds true of cameras such as video cameras and cameras used for industrial purposes. Also, the logic of the control flow of these operations in the camera is generally set in the form of ROM in a microprocessor. FIG. 15 shows the distance measuring field.

Figure 15A:
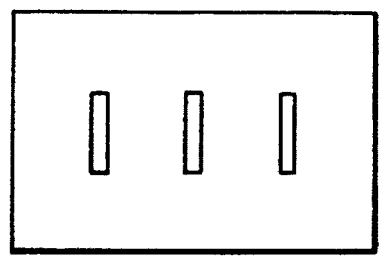
FIGS. 15A and 15B show the distance measuring field according to the second embodiment.

At a step 1, the auto focus program is started, and various flags and the content of the RAM are initially set. At a step 2, the photoelectric area sensor 94 is reset, and then at a step 3, the auto focus area is designated. This designating operation, as previously described, is to write 1-bit information into the SRAM 1 provided in each picture element of the photoelectric area sensor 94. For example, when it is desired in a sensor having M rows and N columns of picture elements to designate three auto focus areas, auto focus area designation bit 1 can be written into each of picture elements (M1, N1)–(M2, N1), (M1, N2)–(M2, N2) and (M1, N3)–(ME, N3). Thereby, the distance measuring field as shown in FIG. 15A is designated.

Figure 15B:
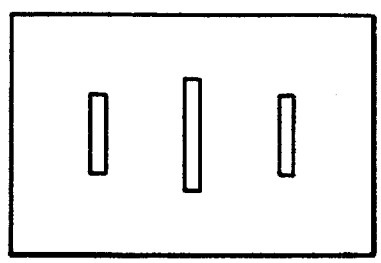

Of course, the length M2-M1 of each column need not be common, but as shown in FIG. 15B, the field of view in the central column N2 may be designated to be long. The number of set areas is not limited to three.

Generally, the desirable distribution of a multipoint focus area differs depending on the focal length of the photo-taking objective lens and also, during the photographing of a moving object, the position of the object moves In the image field and therefore, it is desirable to make the subsequent area setting variable with the progress in the past.

When the area setting is completed, accumulation is started at a step 4. The photoelectric area sensor according to the present invention normally outputs an accumulation amount monitor peak signal Pout,3 whose range is restricted within the designated area, during the accumulating operation. If design is made such that the peak signal of a sensor array including the selected area is input to a comparator for discriminating the completion of accumulation (not shown) and when this signal reaches a predetermined level, the output of said comparator is inverted, the accumulating operation can be detected by detecting the state of the comparator. Accordingly, at steps 5–6, a loop for repetitively watching a group of comparators for discriminating the signals Pout,j of the respective area-designated columns can be set. That is, at the step 5, the outputs of said group of comparators are detected, and at the step 6, on the basis of the discrimination of the result of said detection and the result of said discrimination, advance is made to a step 7. The technique of preparing a plurality of comparator levels at this time, and in a predetermined time after the completion of accumulation, determining the comparator level used depending on the then amount of accumulation is known. The use of such a method can determine the amplifier gain during reading in conformity with the selected comparator level.

When the completion of the accumulation in one or plural areas is detected, at a step 7, the gain of the reading system amplifier is set in accordance, for example, with the above-described method, and at a step 8, serial reading is effected. Thereafter, at a step 9, correlation calculation is effected by a well-known method, whereby the phase difference between two images formed through different optical routes is calculated. At a step 10, the reliability of the result of said correlation calculation is discriminated by a known method, and if the reliability is sufficient, at a step 11, an OK flag showing that automatic focus detection could be accomplished with respect to that area is set, and at a step 12, the result of the calculation is stored. On the other hand, if the discrimination of the reliability of auto focus at the step 10 is not good, at a step 13, an NG flag showing that automatic focus detection could not be accomplished is set.

In any case, advance is made to a step 14, where a maximum accumulation time flag is examined and if this flag is in its set state, it is judged that the accumulation calculation sequence has already been terminated, and advance is made to a step 16 and subsequent steps, and if the maximum accumulation time flag is in its reset state, advance is made to a step 15, where whether the accumulation calculation process with regard to all the designated areas has been completed is checked up, and if such process has been completed, advance is made to the step 16, and if such process has not yet been completed, return is made to the step 5, where the accumulation calculation process is continued with regard to the remaining areas.

Thus, at a point of time whereat the step 16 has been reached, the possibility or impossibility of automatic focus detection is obtained with regard to all of the designated automatic focus areas, and when it is possible, the information of the phase difference between two images is obtained. On the basis of these, to which of the plurality of designated automatic focus areas the main object the photographer wants to photograph corresponds is presumed. Several presuming methods are known, and for example, one of the automatic focus areas capable of being distance-measured which is nearest to the camera is selected. Subsequently, focus adjusting control is effected on the basis of the information of the area which has been presumed to be the main object at the step 16.

Various methods are possible as the specific forms of the focus adjusting control of the lens, and for example, in the case of a system in which the lens is driven on the basis of a defocus amount, at a step 17, the Information of the phase difference between two images is converted into a defocus amount, and at a step 18, the lens is driven by that amount.

On the other hand, if the brightness of the object is low and a predetermined comparator level is not reached even when a preset maximum accumulation time has elapsed, the interruption of a step 19 is applied and the accumulation is forcibly completed. In some cases, the maximum accumulation time is re-defined depending on the photographing mode or the operative state of the camera, and programmable Interruption is preferable.

In the case of such forced completion, it is conceivable that the automatic focus accuracy is deficient by only the amount of charges accumulated in a row of sensor arrays and therefore, at a step 20, whether the addition of the signal of the adjacent array should be done is discriminated. Many objects have a brightness distribution also in the row direction orthogonal to the column direction of the sensor, and adding and mixing the adjacent array signal leads to the smoothing of the feature of the object pattern and the loss of information. On the other hand, in the case of remarkably low brightness, said object pattern itself is buried in electrical noise and therefore, even if the object pattern is more or less smoothed, the improvement by an increase in signal amount is more remarkable.

If at the step 20, it is judged that the adding operation is unnecessary, the control is returned to the normal sequence of the step 7. On the other hand, if it is judged that it is more advantageous to effect the adding operation, at a step 21, the range of the array added is designated, and at a step 22, the gain of the reading amplifier is designated, and at a step 23, the added value is read. After the correlation calculation, return is made to the normal sequence.

In the foregoing, description has been made of a case where the added value reading method is applied during low brightness which does not reach a predetermined signal level even during the maximum accumulation time, whereas the present invention is not restricted to such an application but may be positively used, for example, when auxiliary light is used. That is, the automatic focus auxiliary light of a single-lens reflex camera is often designed to project a stripe-like pattern and therefore, even if a signal is added in the lengthwise direction of this stripe, the bad mixing and smoothing of the pattern will not occur, but only the merit of signal addition is obtained. Accordingly, during the projection of auxiliary light, the signal addition may be set as a standard sequence. Also, in a one-dimensional pattern for which not only auxiliary light is projected, but which does not have structure in a direction in which the image signal is added, i.e., a direction orthogonal to the array direction in which the signal is processed as a sensor array only the merit of added signal reading is obtained and the mixing of patterns by signal addition does not occur. So, when the nature of the object pattern is known, it is also possible to utilize it more fully to shorten the accumulation time.

Also, when the photoelectric area sensor has a non-destruction reading function the added signal can be once read to evaluate the advantages and disadvantages of the signal addition. Further, even if the photoelectric area sensor does not have the non-destruction reading function, there can be executed the procedure of reading an adjacent sensor column to which a signal may be added in a relatively short time, analyzing it in a software-like fashion, and again accumulating it if the merit of the signal addition can be presumed.

A third embodiment of the photoelectric area sensor according to the present invention will now be described with reference to FIG. 11. In FIG. 11 the same portions as those in the second embodiment shown in FIG. 9 are given the same reference numerals.

The feature of the third embodiment is that the CCD used for addition is used as the reading line and the vertical output line also is a CCD.

(1) Operation (1)

(m) Designation of the Automatic Focus Area

This is the same as in the first embodiment.

(n) Accumulating Operation

This is the same as the first embodiment.

(o) Reading Operation

When after the completion of the accumulation, by pulses $\phi j,1$, $\phi j,3$ and $\phi j,6$, the potentials $V\phi j,1$, $V\phi j,3$ and $V\phi j,6$ of the semiconductor layers to which these pulses are applied are set so as to be $$V\phi j,1 < V\phi j,3 < V\phi j,6, \qquad (5)$$

the carrier accumulated In the sensing channel 14 during the accumulation period is transferred to a charge transferring CCD 8. This is transferred to a vertical CCD 38 by CCDs arranged in the horizontal direction, thus completing the reading operation.

Again in this third embodiment, like the "operation" (2) of the first embodiment, the addition of picture elements adjacent to each other in the horizontal direction is possible during the accumulation.

An area sensor of a different type according to the present invention will hereinafter be described as a fourth embodiment. This area sensor also has the following three basic functions:

1) It can arbitrarily designate a plurality of focus detection areas;

2) It can detect the peak value of the quantity of light in the designated area; and 3) It can add a quantity-of-light signal in a direction orthogonal to the picture element direction in which the peak value is detected.

However, this embodiment differs in the basic construction of sensor picture elements, the reading method and the added value reading method.

(1) General Construction

Figure 16:
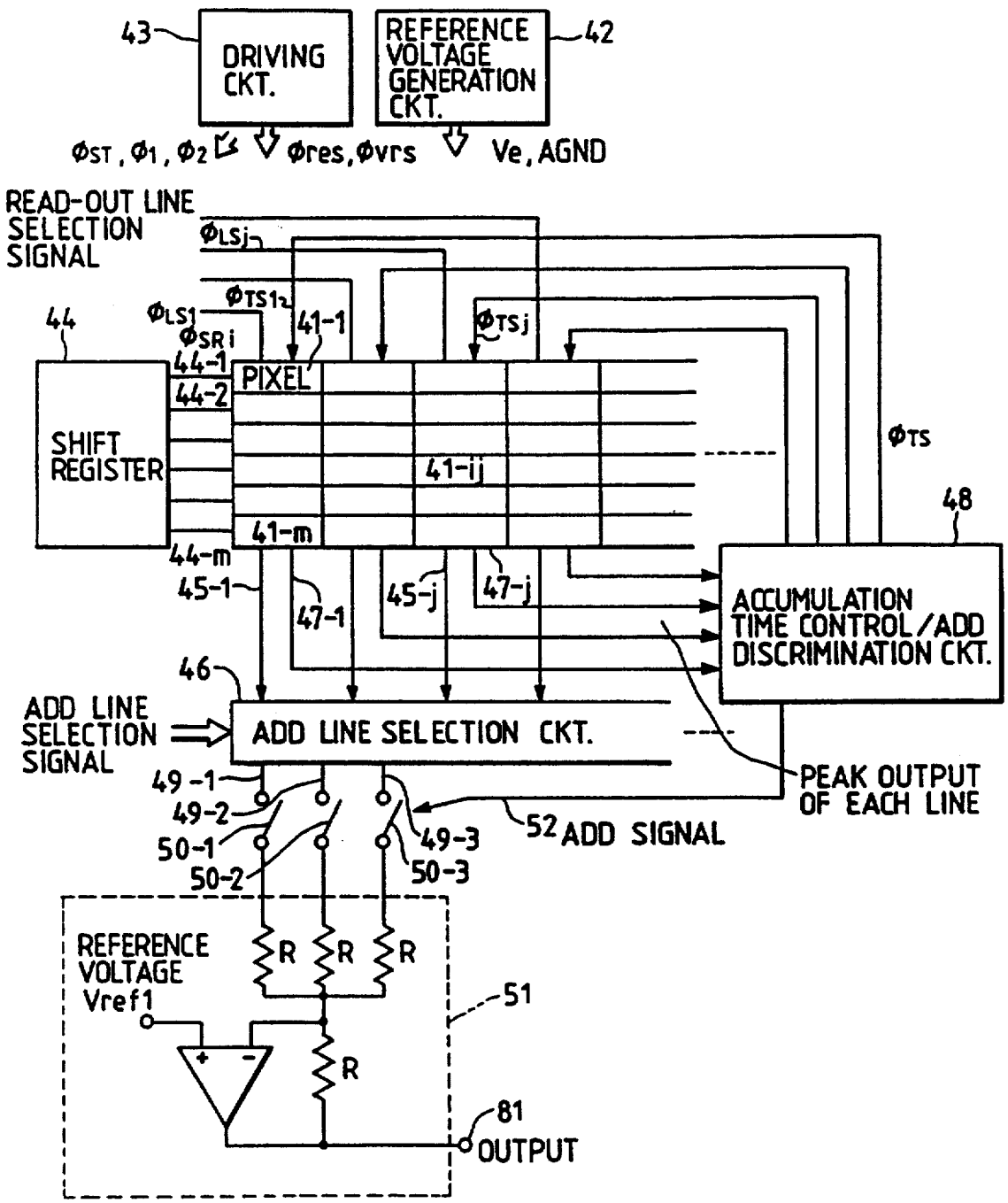
FIG. 16 diagrammatically shows the construction of a semiconductive photoelectric area sensor which is a third embodiment of the present invention.

The construction of the present embodiment is shown in FIG. 16. A reset potential and a driving pulse are supplied to picture elements 41-1,1–41-m,n arranged in m rows and n columns, by a reference voltage generation circuit 42 and a driving circuit 43, respectively. The outputs 44-1–44-m of a shift register 44 are connected to all picture elements In the corresponding rows. Output lines 45-1–45-n in each column are connected to an add line selection circuit 46. Also, peak output lines 47-1–47-n in each column are connected to an accumulation time control/add discrimination circuit 48. Output lines 49-1–49-3 in the column selected by the add line selection circuit 46 (here is shown a case where the addition of two lines adjacent to a designated line is possible, but addition is not limited to two lines) are connected to an add circuit 51 through switches 50-1–50-3, respectively. The switches 50-1 and 50-3 are switches adapted to be closed by an add execution signal 52 when addition is effected, and the switch 50-2 is a normally closed switch inserted to take a pairing property with the switches 50-1 and 50-3.

(2) Construction of Picture Elements

Figure 17:
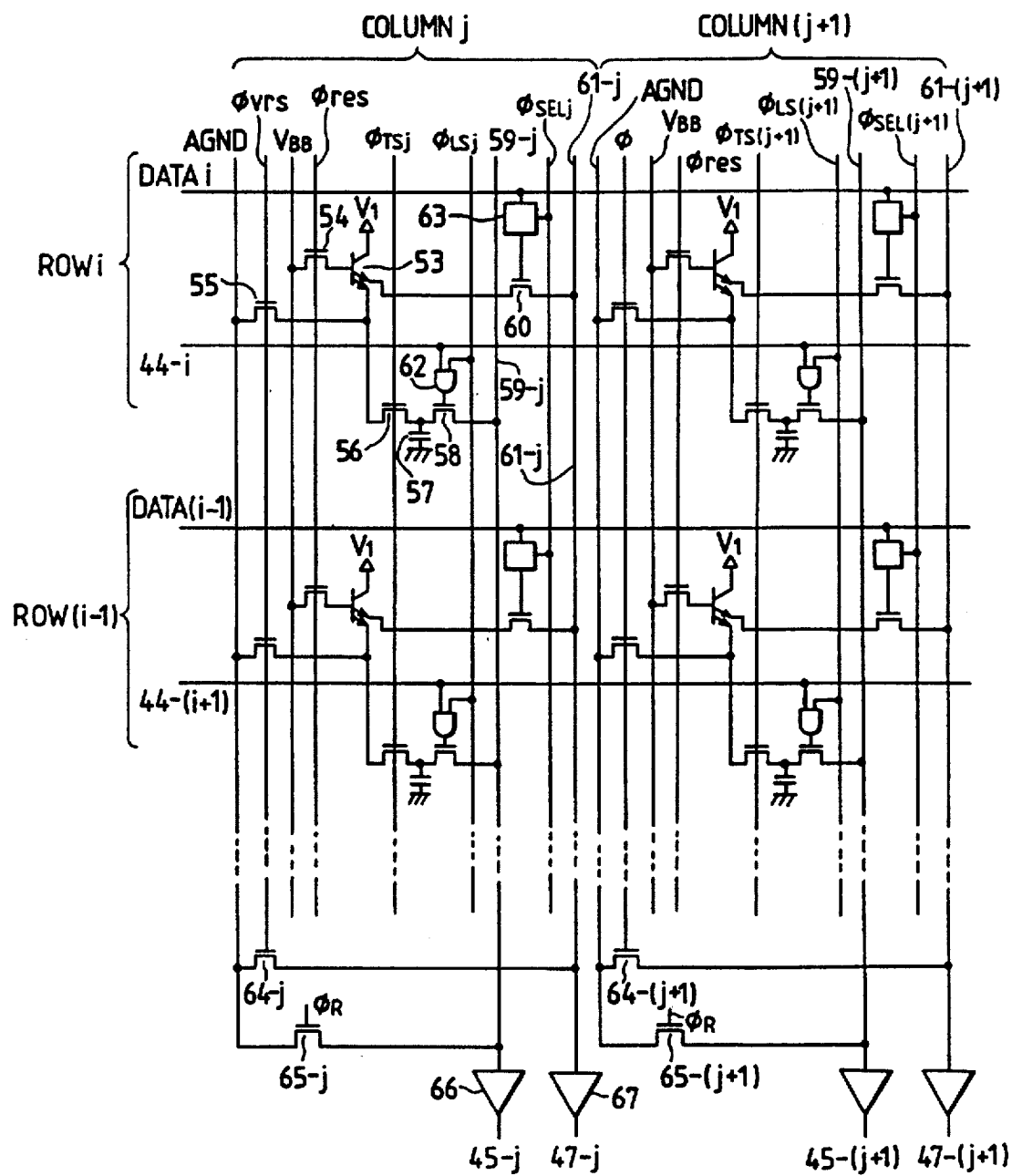
FIG. 17 shows the picture element construction of the photoelectric area sensor of FIG. 16.

FIG. 17 shows the construction of the picture elements of a semiconductive photoelectric area sensor which is the fourth embodiment of the present invention, and particularly shows the construction of the picture elements in rows i-i+1 and columns j-j+1. Description will hereinafter be made of the picture elements in the row i and column j.

The reference numeral 53 designates a phototransistor of double emitter structure, of which the collector is connected to a voltage source V1 and the base is connected to a reference voltage VBB through a reset MOS 54. One of the emitters of this phototransistor 53 is connected to a reference voltage AGND through a reset MOS 55 and is connected to an accumulation capacity 57 through a transfer MOS 56 and is further connected to a reading line 59-j in the row j through a reading MOS 58. The other emitter of the phototransistor 53 is connected to a peak output line 61-j in the row j through an area selection MOS 60.

Base reset pulse $\phi res$ and emitter reset pulse $\phi vrs$ are applied to the gates of the reset MOSs 54 and 55, respectively. Transfer pulse $\phi TSj$ is applied to the gate of the transfer MOS 56. The reference numeral 62 denotes an AND circuit for taking the AND of a reading line selection pulse $\phi LSj$ and the output pulse $\phi SRi$ (44-i) of the shift register and selecting a picture element to be read. The output of the AND circuit 62 is connected to the gate of a reading MOS 58.

Column selection pulse $\phi SELj$ and data line DATAi are connected to a memory circuit 63 for designating an area (which circuit is realized by an SRAM or a shift register, and herein the case of an SRAM will be described). The output of the memory circuit 63 is connected to the gate of an area selection MOS 60. A peak output line 61-j in the column j is connected to AGND through a peak output line reset MOS 64-j, and a reading line 59-j in the column j is connected to AGND through a reset MOS 65-j.

Reset pulses $\phi vrs$ and $\phi R$ are applied to the gates of the peak output line reset MOS 64-j and the reset MOS 65-j, respectively. The reference numerals 66 and 67 designate buffers which put out a sensor output and a peak output, respectively, at a low impedance.

(3) Add Line Selection Circuit

Figure 18:
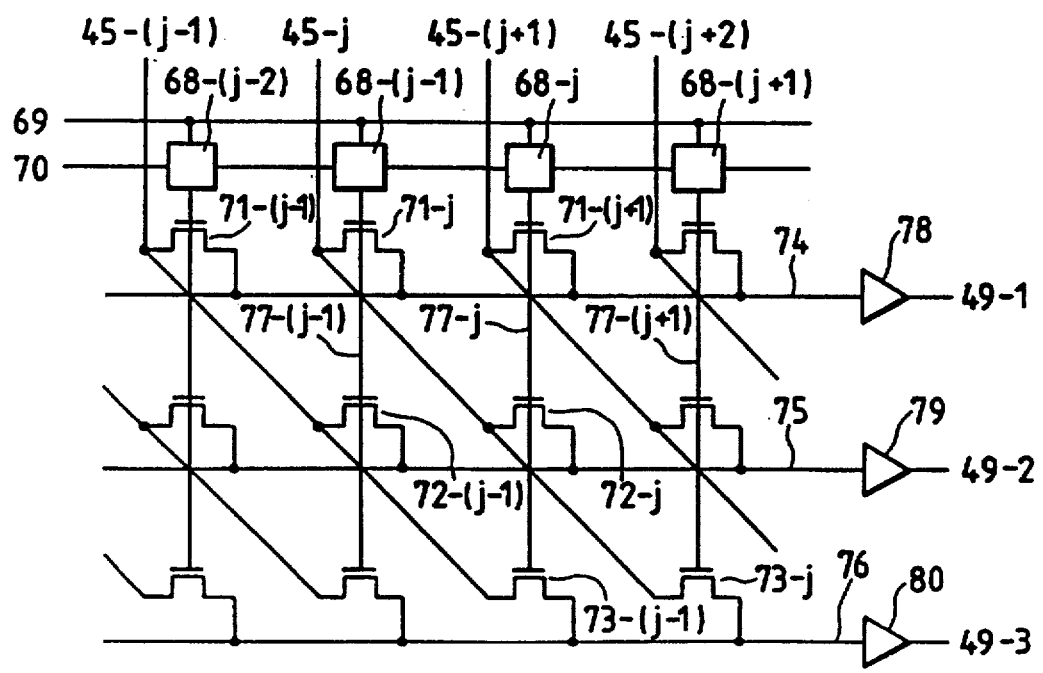
FIG. 18 shows the construction of an add line selection circuit in the photoelectric area sensor of FIG. 16.

The construction of the add line selection circuit 46 is shown in FIG. 18. Memory circuits 68-1–68-n for designating the add line are each comprised, for example, of a shift register, and a driving pulse line 69 and a data line 70 are connected thereto. The column j will hereinafter be described. The output line 45-j of the sensor in the column j are connected to lines 74, 75 and 76 through switch MOSs 71-j, 72-j and 73-j, respectively. On the other hand, 77-(j−1), 77-j and 77-(j+1) which are the outputs of memory circuits 68-(j−1), 68-j and 68-(j+1), respectively, are connected to the gates of switch MOSs 71-j–73-j. Also, output buffers 78-80 are provided between lines 74-76 and output lines 49-1–49-3.

(4) Operation (p) Designation of Automatic Focus Area

Pulses $\phi SELj$ and DATAi are applied to the memory circuits provided in the respective picture element portions, and a potential which renders the area selection MOS 60 ON is memorized only in the picture element which designates the area. Thereby, only the emitter of the picture element designated in each column is connected to the peak output line 61, and the maximum value of the designated picture element is output to the peak output line 47.

(q) Accumulating Operation

Figure 19:
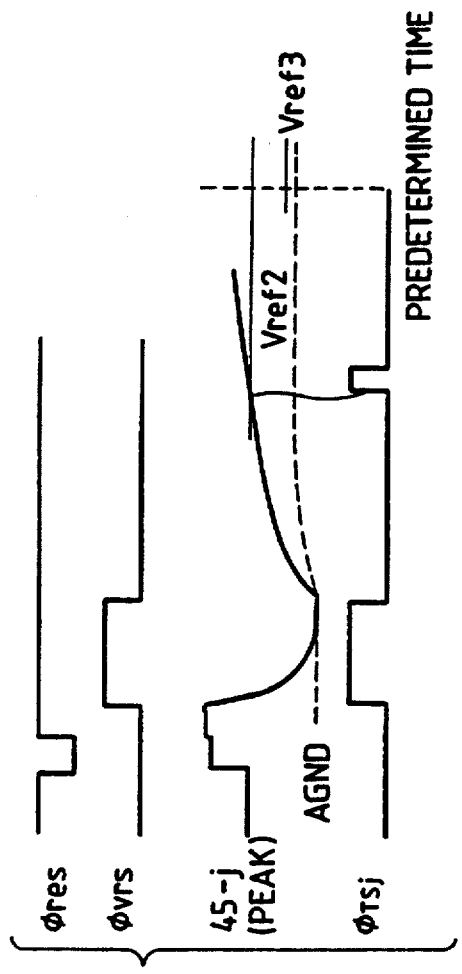
FIG. 19 shows photoelectric charge accumulating operation starting pulses in the photoelectric area sensor of FIG. 16.

By applying the pulses shown as φres and φvrs in FIG. 19, the sensor is reset and photoelectric charge accumulation is started and at the same time, the maximum value of the picture element designated by the peak output line in each column is output.

By rendering φTSj ON when φvrs is ON, the accumulation capacity 57 is reset.

(r) Termination of Accumulation

When the peak output line 47-j in the column j reaches a predetermined potential Vref2, φTSj is rendered ON, and the sensor outputs in the column j at that point of time are read In the accumulation capacity (corresponding to 57). In this case, it is judged that a sufficient signal component has been obtained within a predetermined time, and the addition of a signal is not effected.

If the peak output line 47-j has not reached Vref2 within the predetermined time, φTSj is forcibly rendered ON and accumulation is terminated. If at this time, the output line 45-j does not reach a second potential Vref3 (Vref3<Vref2) and is not saturated even when the signals of the adjacent column are added, it is judged that addition should be effected. Alternatively, whether addition should be effected may be judged by reading the peak values of the adjacent columns of the output lines 45-(j−1), 45-j and 45-(j+1) at the forced termination, and on the basis of the standard that the sum thereof does not exceed the saturation level.

(s) Reading and Addition

When addition is not effected, only the reading line is designated by φLSj and the memory circuit 68-j for add line selection, and φSRi (44-1 (i=1-m)) are successively rendered ON by the shift register 44, whereby charges accumulated in the accumulation capacity (corresponding to 57) are capacity-divided, and are output to the output line 45-j through the reading line 59, and are further output to the output line 49-2 through the switch MOS 72-j. At this time, the switches 50-1 and 50-3 do not effect addition and therefore are rendered OFF and thus, the signal of the output line 49-2 is intactly output with the reference potential Vref1 as the reference.

Figure 20:
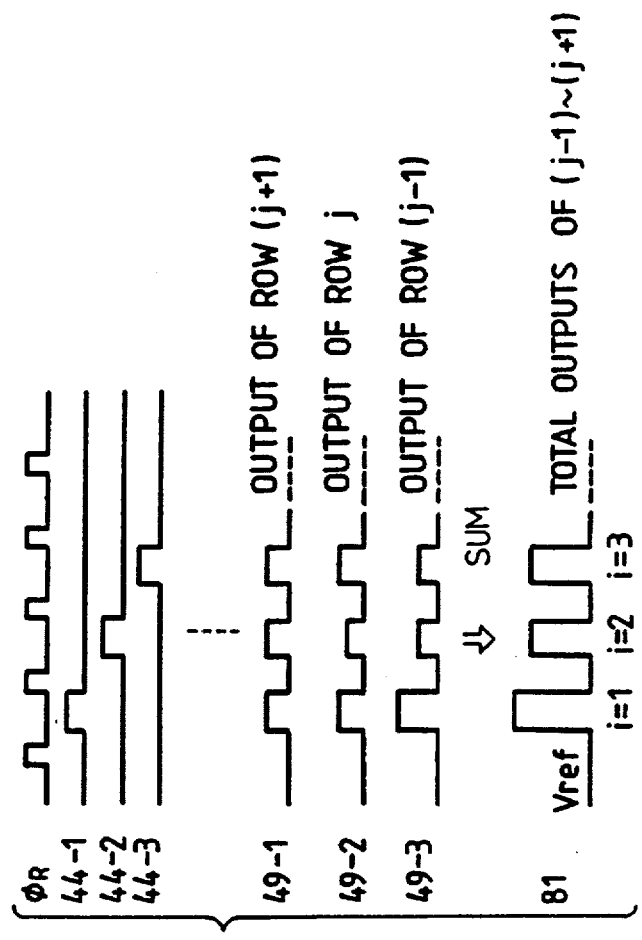
FIG. 20 shows pulses when signal addition in the photoelectric area sensor of FIG. 16 is effected.

FIG. 20 shows pulses when signal addition is effected. As shown in FIG. 20, when signal addition is effected, the line selection pulses (φlS(j−1)−φlS(j+1)) of a line added are designated and at the same time, the add line selection memory circuit 68-j of the central line added is designated. When 44-i (i=1-m) are successively rendered ON by the shift register 44, the outputs of the columns j-1,j and j+1 are put out to the output lines 45-(j=1), 45-j and 45-(j+1), respectively.

At this time, the switch MOSs 71-(j+1), 72-j and 73-(j−1) are ON and therefore, the output of the output line 45-(j+1), the output of the output line 45-j and the output of the output line 45-(j−1) appear on the lines 74, 75 and 76, respectively, and are output to the output lines 49-1–49-3, respectively, of the columns through the buffers 78–80. When addition is to be effected the switches 50-1 and 50-3 are rendered ON and therefore, the sum of the outputs of the output lines 49-1–49-3 of the columns are output to the output 81 (FIG. 16) with Vref1 as the reference.

Figure 21:
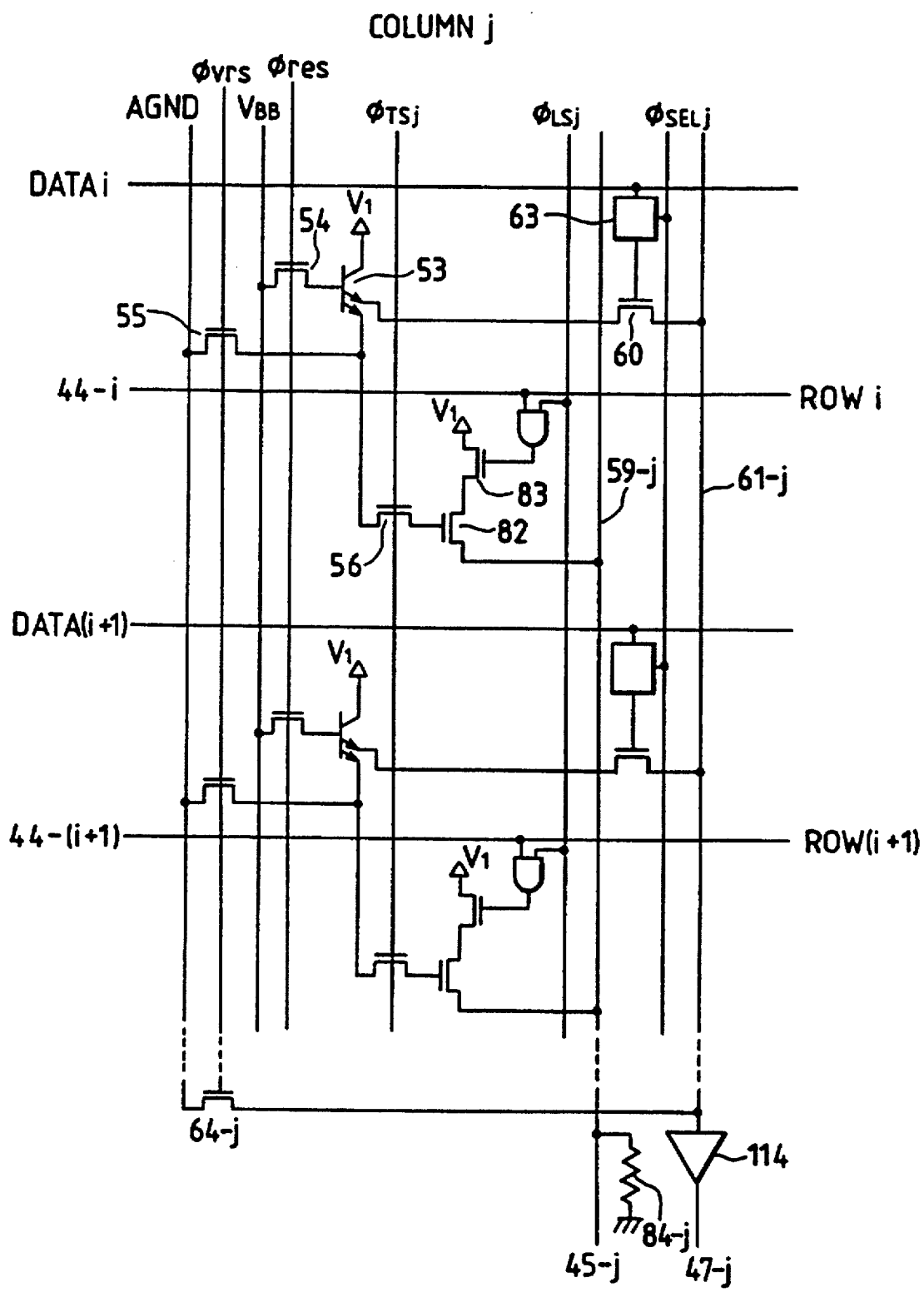
FIG. 21 shows a picture element construction in which portions of a semiconductive photoelectric sensor which is a fourth embodiment of the present invention are changed.
Figure 22:
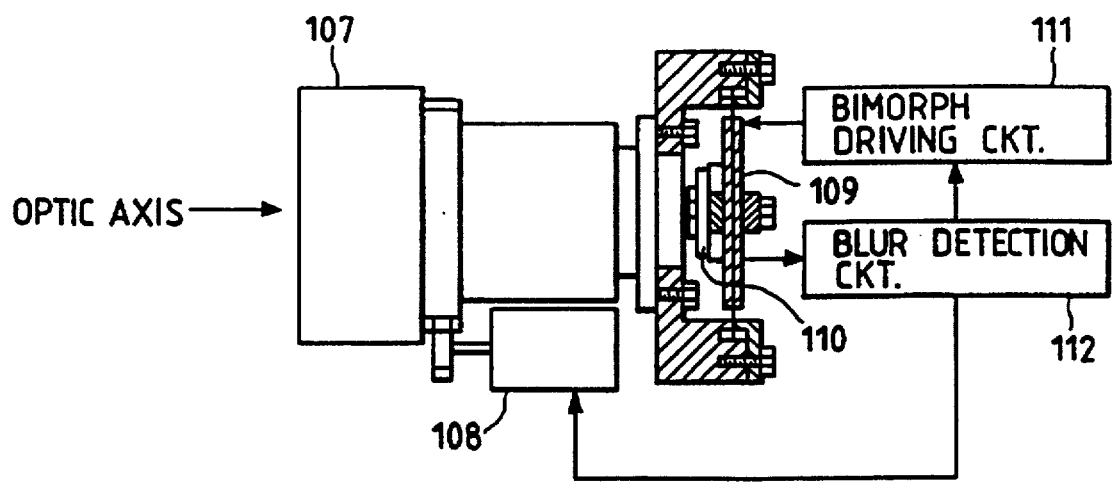
FIG. 22 schematically shows the construction of a prior-art photographing apparatus used with a two-dimensional photoelectric area sensor as an image pickup element.

FIG. 21 shows a picture element construction in which the above-described fourth embodiment is partly changed. In this embodiment, one of the emitters of a photodiode of double emitter structure is connected to the gate of a reading MOS 82 through a transfer MOS 56. The drain of the reading MOS 82 is connected to a voltage source V1 through a reading picture element selecting MOS 83, and the source thereof is connected to a reading line 59-j in column j.

The output of an AND circuit 62 is connected to the gate of the reading picture element selecting MOS 83, and a reading line 59-j in each column is connected to the ground through a load 84-j, and the reading MOS 82 and the load 84-j together constitute a source follower circuit.

The area designating and accumulating operations are the same as those in the previous embodiment. The accumulation terminating operation is such that when a pulse φTSj is rendered ON, the then emitter potential of the sensor is read by the gate of the reading MOS 82 through the transfer MOS 56. When thereafter, the pulse φTSj is rendered OFF, the emitter potential at this time is held as a charge charged in the gate capacitor of the transfer MOS 56.

The discrimination of addition is the same as that in the previous embodiment. Reading is such that when a reading line is designated by φSELj and the shift register 44 is operated, the AND circuit 62 of the selected picture element outputs "H" (high level), the picture element selecting MOS 83 is rendered ON and the voltage of the corresponding picture element during the termination of accumulation is output to the output line 45-j by the source follower. The operation thereafter is similar to that in the previous embodiment.

Description will now be made of the compensating operation when some unsatisfactory picture elements exist in the area sensor in each of the above-described embodiments.

It is to be understood that the block diagram of FIG. 1 is used as the construction of the automatic focus detecting apparatus, the optical system of FIG. 8 is used as the optical system thereof, and as the processing flow, processing is carried out in the flow of FIG. 2.

In the process wherein processing is carried out in accordance with the flow of FIG. 2, the working process of the step 104 for the object image signal is carried out as previously described.

Let It be assumed that the area 208b of FIG. 3 has been selected as the area.

Figure 23:
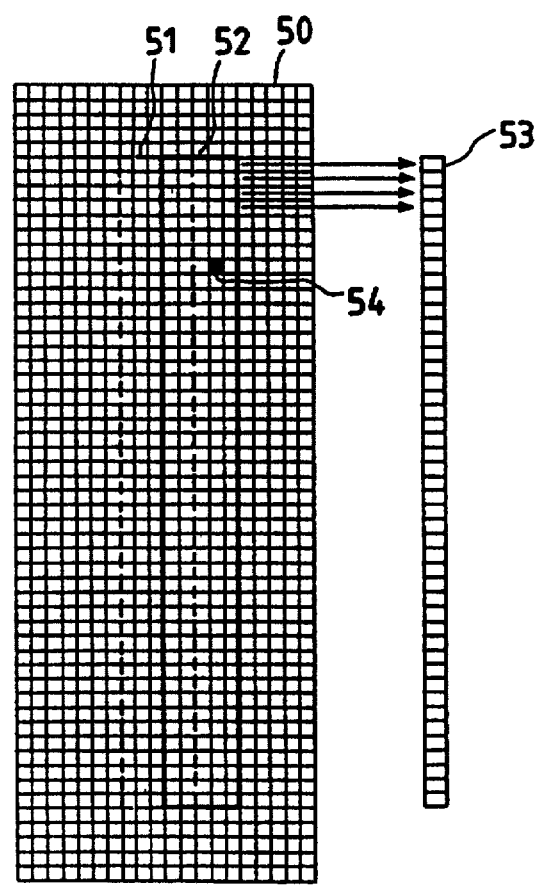
FIG. 23 illustrates the picture element output processing of the sensor in the present invention.

It is to be understood that the rectangular object area 208b on the photographing image field is such as shown by the solid-line area 52 of FIG. 23 on a portion 50 of the sensor chip 201. FIG. 23 shows one of the sensor light receiving areas, but the other light receiving area is also similar to this.

When the focus detecting process is actually carried out, the phase difference in a one-dimensional direction is detected in the phase difference detection type and therefore, it is necessary that the object information of an area having a two-dimensional direction be converted into one-dimensional information. For that purpose, by the use of the object image signal stored in the RAM in the microcomputer, the horizontal image signal in the area can be added to each picture element unit in the vertical direction to thereby make a one-dimensional image signal 53. The focus detection operation is effected for the one-dimensional image signal 53.

Figure 24:
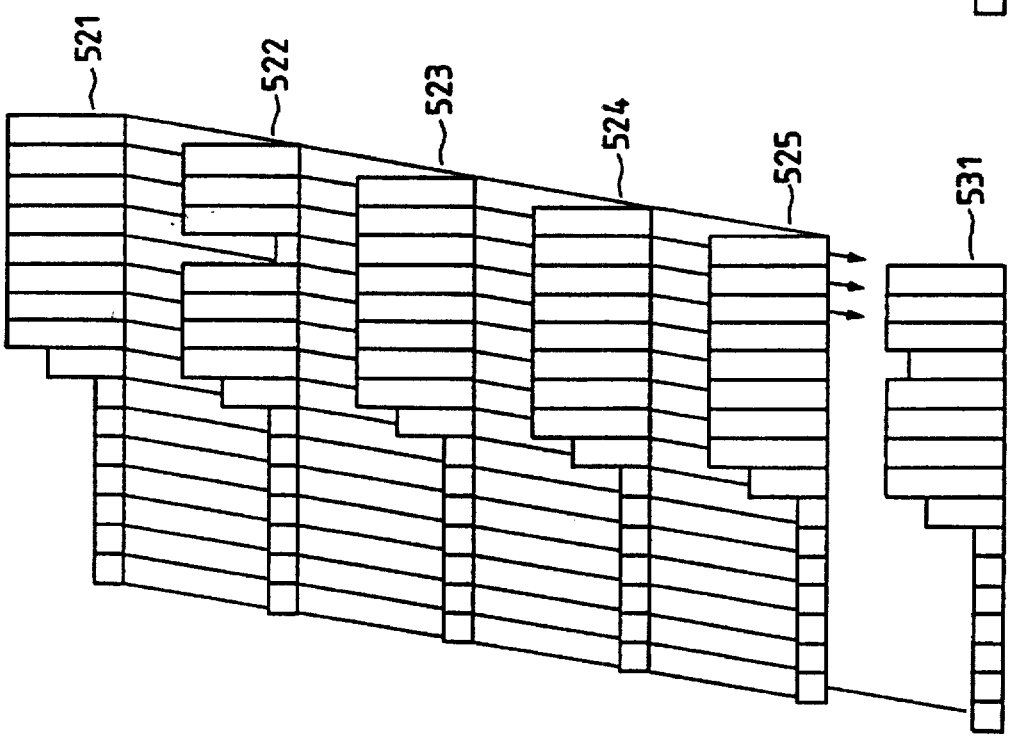
FIG. 24 illustrates the output of the sensor in FIG. 23.

Now, let it be assumed that an unsatisfactory picture element 54 exists in the area 52 Dn the sensor which is the object of the focus detection process. FIG. 24 shows the state of image signals in the arrangement of vertical directions at this time.

In FIG. 24, the reference numerals 521–525 represent image signals read in each picture element column in the area 52 of FIG. 23, i.e., the arrangement of vertical directions. The fourth picture element from the right of the signal 522 corresponds to the unsatisfactory picture element 54, and the signal of this picture element is reduced as shown.

A signal resulting from the signals 521–525 in respective picture element columns being added in the row direction of each picture element, i.e., intactly in each horizontal direction, is such as shown as a signal 531. The fourth signal from the right of the signal 531 is reduced under the influence of the unsatisfactory picture element. It is apparent that if the focus detection process is carried out on the basis of this signal 531, the result thereof will suffer from not a little error.

Figure 25:
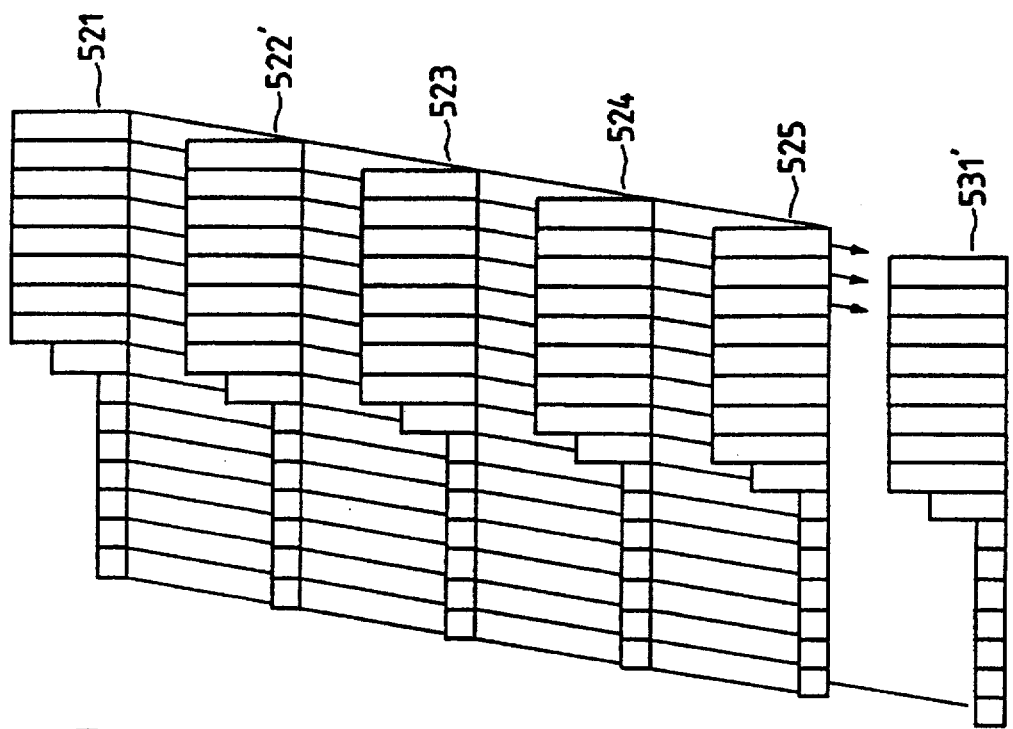
FIG. 25, together with FIG. 24 illustrates the output of the sensor.

So, if the location of the unsatisfactory picture element is known in advance in the inspection process or the like, the information of that location is pre-memorized in the EEPROM in the microcomputer 203 of FIG. 1. When the addition of the image signal is effected, that information is used to replace the image signal corresponding to the location of the unsatisfactory picture element, for example, with the signal of other normal picture element adjacent thereto. Describing this with reference to FIG. 25, the signal of the fourth picture element from the right of a signal 522' is one replaced with the fourth picture element signal from the right of the signal 523, and a signal resulting from these signals 521, 522' and 523–525 having been added in each horizontal picture element is a signal 531'. In this case, the signal 531' is a signal approximate to the actual signal as compared with the signal 531 of FIG. 24, and if the focus detection process is carried out by the use of this signal 531', the error can be minimized.

When no unsatisfactory picture element exists on the area sensor, or when even though any unsatisfactory picture element exists on the area sensor, no unsatisfactory picture element exists in an area 51 indicated by broken line in FIG. 23 as the object area of the focus detection process, the above-described replacing process is of course not required.

After the compensating process for the unsatisfactory picture element is carried out in this manner, the step 105 of FIG. 2 is executed, and from the one-dimensional image signal made at the step 104, the focus state of a desired photographing image field area is detected by the use of the conventional focus detection calculation.

What is claimed is:

1. A focus adjusting apparatus comprising:
   a sensor circuit having a first area sensor portion and a second area sensor portion, each area portion including a plurality of elements;
   an optical system which causes the first and second area sensor portions to receive light from a target object;
   a designating circuit which designates a detection area for focus adjusting, said designating circuit designating a predetermined area of the first sensor portion and a predetermined area of the second sensor portion which corresponds to the predetermined area of the first sensor portion in accordance with the designated detection area;
   a compensation circuit which corrects a signal from a disabled element among the elements of the predetermined area of the sensor portions corresponding to the designated detection area, said compensation circuit forming, as a signal from the disabled element, a signal based on a signal from an element which is proximate to the disabled element and which is in the predetermined area of the sensor portion; and
   a calculation circuit which calculates data for the focus adjusting based on the signal from the elements of the predetermined area of the first and second sensor portions.

2. An apparatus according to claim 1, further comprising a taking-out circuit for taking out signals from the elements of the predetermined area of the first sensor portion and from the elements of the predetermined area of the second sensor portion, and wherein said compensation circuit corrects the signal from the disabled element among the signals from each element taken out by said taking-out circuit based on the signal from the element proximate to the disabled element.

3. An apparatus according to claim 2, wherein said designating circuit is capable of designating a plurality of different detection areas and is capable of designating a plurality of predetermined areas in a sensor portion which corresponds to the designated detection area.

4. An apparatus according to claim 1, wherein each of the first and second sensor portions comprises a plurality of elements which are disposed in a matrix arrangement having a plurality of rows and a plurality of columns, and wherein said designating circuit designates a plurality of rows and a plurality of columns of the matrix-arranged elements as the predetermined area.

5. An apparatus according to claim 4, wherein the element in proximity to the disabled element is an element positioned in the same row as the disabled element.

6. A focus adjusting apparatus comprising:
   a sensor circuit having a first area sensor portion and a second area sensor portion, each area sensor portion including a plurality of elements;
   an optical system which causes the first and second area sensor portions to receive light from a target object;
   a designating circuit which designates a detection area for focus adjusting, said designating circuit designating a predetermined area of the first sensor portion and a predetermined area of the second sensor portion which corresponds to the predetermined area of the first sensor portion in accordance with the designated detection area;
   a taking-out circuit which takes out signals from elements in the predetermined areas of the first and second sensor portions corresponding to the designated detection area;
   a store circuit which stores the signals taken out by said taking-out circuit;
   a compensation circuit which corrects a defective signal among the signals stored in said store circuit based on a signal which corresponds to an element in the predetermined area and which is in proximity to the element from which the defective signal is derived; and
   a calculation circuit which calculates data for the focus adjusting based on the signals, stored in said store circuit, from the elements of the predetermined areas of the first and second sensor portions.

7. An apparatus according to claim 6, wherein said designating circuit is capable of designating a plurality of different detection areas and is capable of designating a plurality of predetermined areas in a sensor portion which corresponds to the designated detection area.

8. An apparatus according to claim 7, wherein each of the first and second sensor portions comprises a plurality of elements which are disposed in a matrix arrangement having a plurality of rows and a plurality of columns, and wherein said designating circuit designates a plurality of rows and a plurality of columns of the matrix-arranged elements as the predetermined area.

9. An apparatus according to claim 6, wherein the element in proximity to the element from which the defective signal is derived is an element positioned in the same row as the element from which the defective signal is derived.

* * * * *

UNITED STATES PATENT AND TRADEMARK OFFICE
CERTIFICATE OF CORRECTION

PATENT NO. : 5,615,399  Page 1 of 3
DATED : March 25, 1997
INVENTOR(S) : Akira AKASHI, et al.

It is certified that error appears in the above-identified patent and that said Letters Patent is hereby corrected as shown below:

COLUMN 1:

Line 15, "Use" should read --use--.

COLUMN 4:

Line 22, "Just" should read --just--.

COLUMN 5:

Line 3, "settling" should read --setting--; and
Line 45, "8A and 8B" should read --3A and 3B--.

COLUMN 6:

Line 65, "shown" should read --shows--.

COLUMN 10:

Line 5, "electrodes 289" should read --electrodes 239--.

COLUMN 13:

Line 6, "If" should read --if--.

UNITED STATES PATENT AND TRADEMARK OFFICE
CERTIFICATE OF CORRECTION

PATENT NO. : 5,615,399
DATED : March 25, 1997
INVENTOR(S) : Akira AKASHI, et al.

It is certified that error appears in the above-identified patent and that said Letters Patent is hereby corrected as shown below:

COLUMN 15:

Line 50, "Photodiode" should read --photodiode--.

COLUMN 16:

Line 60, "(ME, N3)." should read --(M2, N3).--.

COLUMN 17:

Line 2, "In" should read --in--.

COLUMN 18:

Line 9, "Information" should read --information--; and
    Line 19, "Interruption" should read --interruption--.

UNITED STATES PATENT AND TRADEMARK OFFICE
CERTIFICATE OF CORRECTION

PATENT NO. : 5,615,399
DATED : March 25, 1997
INVENTOR(S) : Akira AKASHI, et al.

It is certified that error appears in the above-identified patent and that said Letters Patent is hereby corrected as shown below:

COLUMN 19:

Line 28, "In" should read --in--;
Line 33, ""operation" (2)" should read --"operation (2)"--; and
Line 58, "In" should read --in--.

COLUMN 21:

Line 45, "($\phi$1S(j-1)-$\phi$1S(j+1))" should read --($\phi$LS(j-1)-$\phi$LS(j+1))--; and
Line 58, "0N" should read --ON--.

COLUMN 22:

Line 38, "It" should read --it--; and
Line 58, "Dn" should read --on--.

Signed and Sealed this

Twenty-third Day of September, 1997

Attest:

BRUCE LEHMAN

Attesting Officer  Commissioner of Patents and Trademarks